US009219582B2

(12) United States Patent
Yano et al.

(10) Patent No.: US 9,219,582 B2
(45) Date of Patent: Dec. 22, 2015

(54) METHOD, SYSTEM, AND APPARATUS FOR RADIO COMMUNICATIONS

(71) Applicant: FUJITSU LIMITED, Kawasaki-shi, Kanagawa (JP)

(72) Inventors: Tetsuya Yano, Yokohama (JP); Yoshihiro Kawasaki, Yokosuka (JP); Yoshiaki Ohta, Yokohama (JP); Yoshinori Tanaka, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 669 days.

(21) Appl. No.: 13/627,661

(22) Filed: Sep. 26, 2012

(65) Prior Publication Data

US 2013/0022005 A1    Jan. 24, 2013

Related U.S. Application Data

(63) Continuation of application No. PCT/JP2010/055935, filed on Mar. 31, 2010.

(51) Int. Cl.
  *H04L 5/00* (2006.01)
  *H04L 1/00* (2006.01)
(52) U.S. Cl.
  CPC .............. *H04L 5/001* (2013.01); *H04L 1/0046* (2013.01); *H04L 5/0053* (2013.01); *H04L 5/0091* (2013.01)
(58) Field of Classification Search
  CPC .... H04B 7/155; H04B 7/15585; H04B 15/00; H04L 5/001–5/0098
  See application file for complete search history.

(56) References Cited

U.S. PATENT DOCUMENTS

| 8,867,430 | B2 * | 10/2014 | Chung .................. H04L 1/1822 370/216 |
| 2010/0322158 | A1 * | 12/2010 | Lee et al. ....................... 370/329 |
| 2011/0141996 | A1 * | 6/2011 | Yamada et al. ............... 370/329 |
| 2012/0307759 | A1 | 12/2012 | Miki |

FOREIGN PATENT DOCUMENTS

JP    2011-142599    7/2011

OTHER PUBLICATIONS

LG Electronics; "Construction of PDCCH search spaces for cross-carrier scheduling in multiple carrier aggregation"; Agenda Item: 7.1.5; 3GPP TSG RAN WG1 #59b; R1-100214; Valencia, Spain; Jan. 18-22, 2010.

(Continued)

*Primary Examiner* — Ian N Moore
*Assistant Examiner* — Latresa McCallum
(74) *Attorney, Agent, or Firm* — Myers Wolin, LLC

(57) ABSTRACT

A first radio communication apparatus transmits first and second control signals to a second communication apparatus. The first control signal carries information to be used in communication performed with a first frequency band. The second control signal carries information to be used in communication performed with a second frequency band. The second radio communication apparatus detects these first and second control signals by attempting signal extraction from received signals with common candidates for control signal length. The first radio communication apparatus controls whether to use one frequency band or more than one frequency band to transmit the first and second control signals, based on bandwidths of the first and second frequency bands.

12 Claims, 26 Drawing Sheets

(56) References Cited

OTHER PUBLICATIONS

Samsung; "PDCCH Blind Decoding Operations in Rel. 10"; Agenda Item: 7.1.5; 3GPP TSG RAN WG1 #59bis; R1-100094; Valencia, Spain; Jan. 19-23, 2010.

Huawei; "Views on LTE-A PDCCH blind decodes"; Agenda Item: 7.1.5; 3GPP TSG RAN WG1 meeting #59b; R1-100242; Valencia, Spain; Jan. 18-22, 2010.

NEC Group; "Minimising the impact of cross carrier scheduling on blind decoding"; Agenda Item: 7.1.5; 3GPP TSG-RAN WG1 Meeting #59bis; R1-100302; Valencia, Spain; Jan. 18-22, 2010.

Nokia, Nokia Siemens Networks; "Cross-CC scheduling and blind decoding"; Agenda Item: 7.1.5; 3GPP TSG-RAN WG1 Meeting #59bis; R1-100319; Valencia, Spain; Jan. 18-22, 2010.

3GPP TS 36.211 V9.0.0 (Dec. 2009); 3rd Generation Partnership Project; Technical Specification Group Radio Access Network; Evolved Universal Terrestrial Radio Access (E-UTRA); "Physical Channels and Modulation (Release 9)"; Dec. 2009.

3GPP TS 36.213 V9.0.1(Dec. 2009); 3rd Generation Partnership Project; Technical Specification Group Radio Access Network; Evolved Universal Terrestrial Radio Access (E-UTRA); "Physical layer procedures (Release 9)"; Dec. 2009.

Alcatel-Lucent et al; "Way Forward on PDCCH for Bandwidth Extension in LTE-A"; 3GPP TSG RAN WG1 Meeting #58; R1-093699; Shenzhen, China; Aug. 24-28, 2009; [http://www.3gpp.org/ftp/tsg_ran/WG1_RL1/TSGR1_58/Docs/].

International search report issued for corresponding International Patent Application No. PCT/JP2010/055935 mailed Jul. 6, 2010.

Panasonic; "PDCCH with cross carrier operation"; Agenda Item: 7.1.3; 3GPP TSG-RAN WG1 Meeting #60; R1-101249; San Francisco, USA; Jan. 22-26, 2010.

LG Electronics; "Construction of PDCCH search spaces for cross-carrier scheduling in carrier aggregation"; Agenda Item: 7.1.3; 3GPP TSG RAN WG1 #60; R1-101347; San Francisco, USA; Feb. 22-26, 2010.

3GPP TS 36.212 V9.0.0 (Dec. 2009); 3rd Generation Partnership Project; Technical Specification Group Radio Access Network; Evolved Universal Terrestrial Radio Access (E-UTRA); "Multiplexing and channel coding (Release 9)"; Dec. 2009.

MCC Support; "Final Report of 3GPP TSG RAN WG1 #58 v1.0.0 (Shenzhen, China, Aug. 24-28, 2009)"; Agenda Item: 3; 3GPP TSG RAN WG1 Meeting #58bis; R1-093746; Miyazaki, Japan; Oct. 12-16, 2009.

MCC Support; "Final Report of 3GPP TSG RAN WG1 #59 v1.0.0 (Jeju, South Korea, Nov. 9-13, 2009)"; 3GPP TSG RAN WG1 Meeting #59bis; R1-100002; Valencia, Spain; Jan. 18-22, 2010.

LG Electronics; "Configuration and activation of carrier indicator field in PDCCH for multiple carrier aggregation"; Agenda Item: 7.2.1.1; 3GPP TSG RAN WG1 #59; R1-094468; Jeju, Korea; Nov. 9-13, 2009.

Qualcomm Incorporated; "PDCCH for CA: monitoring set and blind decodes"; Agenda Item: 7.1.3; 3GPP TSG RAN WG1 #60; R1-101476; San Francisco, USA; Feb. 22-26, 2010.

Huawei; "LTE-A PDCCH blind decoding"; Agenda Item: 7.1.3; 3GPP TSG RAN WG1 meeting #60; R1-101048; San Francisco, USA; Feb. 22-26, 2010.

CATT; "PDCCH blind decoding in LTE-A"; Agenda Item: 7.1.3; 3GPP TSG Ran WG1 meeting #60; R1-100874; San Francisco, USA; Feb. 22-26, 2010.

Qualcomm Incorporated; "PDCCH for carrier aggregation: monitoring set and blind decodes"; Agenda Item: 7.1.5; 3GPP TSG RAN WG1 #59bis; R1-100674; Valencia, Spain; Jan. 18-22, 2010.

Japanese Patent Office Action issued Nov. 26, 2013 for Japanese Patent Application No. 2012-507992, with partial English translation.

* cited by examiner

FIG. 6

| SEARCH SPACE | | | PDCCH CANDIDATES |
|---|---|---|---|
| TYPE | AGGREGATION LEVEL | SIZE [CCE] | |
| COMMON | 4 | 16 | 4 |
| | 8 | 16 | 2 |
| UE-SPECIFIC | 1 | 6 | 6 |
| | 2 | 12 | 6 |
| | 4 | 8 | 2 |
| | 8 | 16 | 2 |

FIG. 7

|  |  | 0 | 1 | 1A | 1B | 1C | 1D | 2 | 2A | 2B | 3 | 3A |
|---|---|---|---|---|---|---|---|---|---|---|---|---|
| COMMON | SI-RNTI |  |  | O |  | O |  |  |  |  |  |  |
|  | P-RNTI |  |  | O |  | O |  |  |  |  |  |  |
|  | RA-RNTI |  |  | O |  | O |  |  |  |  |  |  |
|  | C-RNTI | O |  | O |  |  |  |  |  |  |  |  |
|  | SPS C-RNTI | O |  | O |  |  |  |  |  |  |  |  |
|  | Temporary C-RNTI | O |  | O |  |  |  |  |  |  |  |  |
|  | TPC-PUCCH-RNTI |  |  |  |  |  |  |  |  |  | O | O |
|  | TPC-PUSCH-RNTI |  |  |  |  |  |  |  |  |  | O | O |

FIG. 8

|  | 0 | 1 | 1A | 1B | 1C | 1D | 2 | 2A | 2B | 3 | 3A |
|---|---|---|---|---|---|---|---|---|---|---|---|
| SI-RNTI | ○ |  |  |  |  |  |  |  |  |  |  |
| P-RNTI | ○ |  |  |  |  |  |  |  |  |  |  |
| RA-RNTI |  |  |  |  |  |  |  |  |  |  |  |
| C-RNTI (UE-SPECIFIC) |  | △ 1,2,7 | ○ | △ 6 |  | △ 5 | △ 4 | △ 3 | △ 8 |  |  |
| SPS C-RNTI (UE-SPECIFIC) |  | △ 1,2,7 | ○ |  |  |  | △ 4 | △ 3 | △ 8 |  |  |
| Temporary C-RNTI (UE-SPECIFIC) |  | △ 1,2,7 | ○ |  |  |  |  |  |  |  |  |
| TPC-PUCCH-RNTI (UE-SPECIFIC) |  |  |  |  |  |  |  |  |  |  |  |
| TPC-PUSCH-RNTI (UE-SPECIFIC) |  |  |  |  |  |  |  |  |  |  |  |

FIG. 9

|  | 0 | 1 | 1A | 1B | 1C | 1D | 2 | 2A | 2B | 3 | 3A |
|---|---|---|---|---|---|---|---|---|---|---|---|
| 6 RB (1.4 MHz) | 38 | 38 | 39 | 41 (43) | 24 | 41 (43) | 50 (53) | 47 (49) | 47 | 38 | 38 |
| 15 RB (3 MHz) | 40 | 43 | 41 | 43 (45) | 26 | 43 (45) | 53 (57) | 50 (52) | 50 | 40 | 40 |
| 25 RB (5 MHz) | 42 | 46 | 43 | 45 (47) | 28 | 45 (47) | 58 (61) | 55 (57) | 55 | 42 | 42 |
| 50 RB (10 MHz) | 44 | 50 | 45 | 47 (49) | 29 | 47 (49) | 62 (65) | 59 (61) | 59 | 44 | 44 |
| 75 RB (15 MHz) | 45 | 52 | 46 | 49 (50) | 30 | 49 (50) | 64 (67) | 61 (63) | 61 | 45 | 45 |
| 100 RB (20 MHz) | 46 | 58 | 47 | 49 (51) | 31 | 49 (51) | 70 (73) | 67 (69) | 67 | 46 | 46 |

FIG. 10

| TYPE | ITEMS | CHANNEL |
|---|---|---|
| BROADCAST INFORMATION | DL CENTRAL FREQUENCY | DATA CHANNEL (PDSCH) or NONE |
| BROADCAST INFORMATION | DL BANDWIDTH | BROADCAST CHANNEL (PBCH) |
| BROADCAST INFORMATION | UL CENTRAL FREQUENCY | DATA CHANNEL (PDSCH) |
| BROADCAST INFORMATION | ULBANDWIDTH | DATA CHANNEL (PDSCH) |
| DEDICATED INFORMATION | GROUP ID | DATA CHANNEL (PDSCH) |
| DEDICATED INFORMATION | CARRIER INDICATOR | DATA CHANNEL (PDSCH) |
| DEDICATED INFORMATION | MONITORING CC | DATA CHANNEL (PDSCH) |
| DEDICATED INFORMATION | DL/UL CC | DATA CHANNEL (PDSCH) |
| DEDICATED INFORMATION | ASSOCIATION BETWEEN MONITORING CC AND CC TO BE USED | DATA CHANNEL (PDSCH) |
| DEDICATED INFORMATION | TRANSMISSION MODE | DATA CHANNEL (PDSCH) |

FIG. 15

| GROUP ID | MONITORING CC | CC TO BE USED | CI | BANDWIDTH | TRANSMISSION MODE |
|---|---|---|---|---|---|
| #1 | CC#1 | CC#1 | 000 | A [RB] | mode X |
| | | CC#2 | 001 | | |
| #2 | CC#3 | CC#3 | 000 | B [RB] | mode Y |
| | | CC#4 | 001 | | |

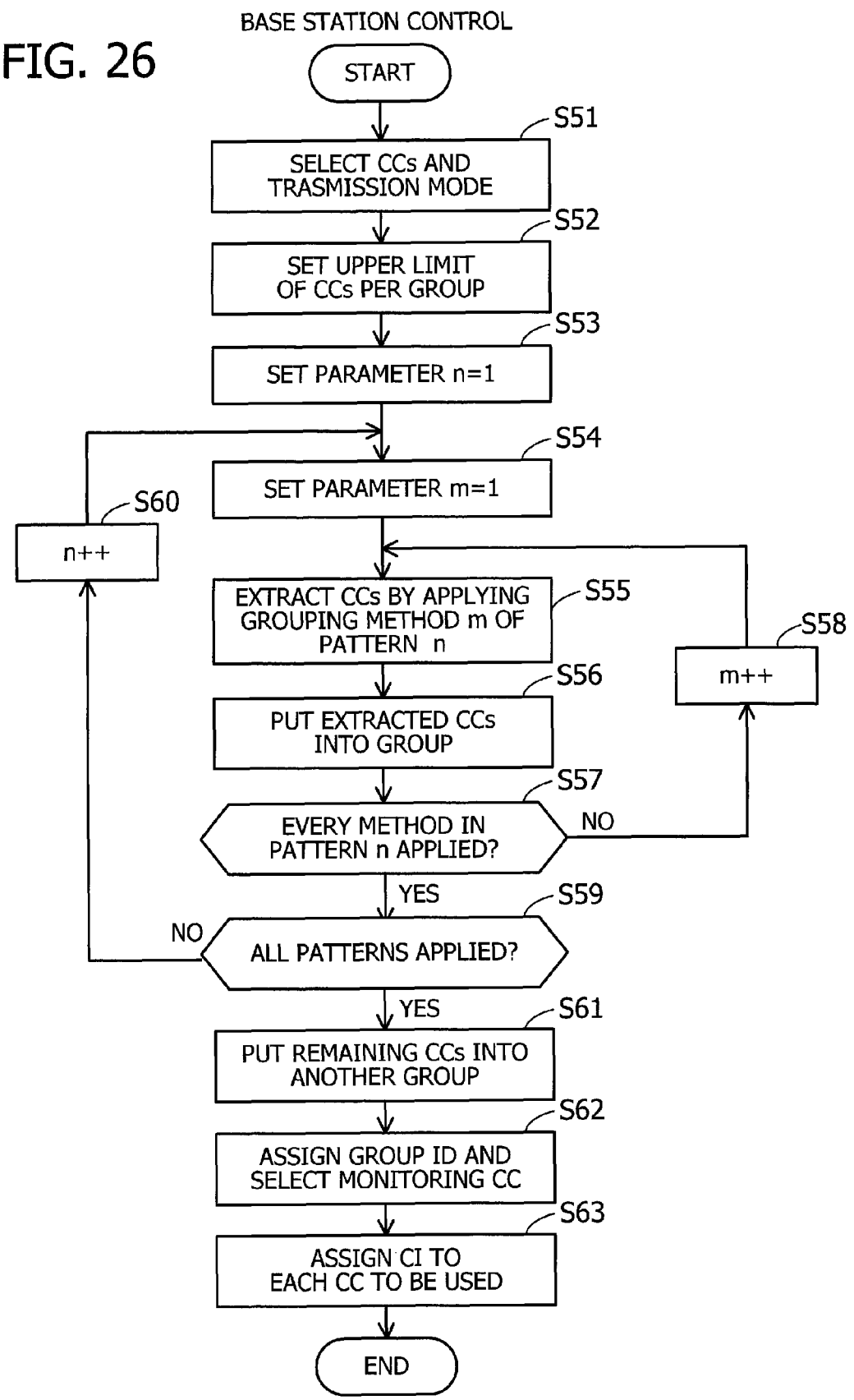

METHOD, SYSTEM, AND APPARATUS FOR RADIO COMMUNICATIONS

CROSS-REFERENCE TO RELATED APPLICATIONS

This application is a continuation application of International Application PCT/JP 2010/055935 filed on Mar. 31, 2010 and designated the U.S., the entire contents of which are incorporated herein by reference.

FIELD

The embodiments discussed herein relate to a method, system, and apparatus for radio communications.

BACKGROUND

Radio communications systems are widely used today, including mobile phone systems and wireless metropolitan-area networks (wireless MAN). The researchers and engineers in the field of radio communications have constantly been discussing the next-generation communications technologies to pursue higher speeds and greater network bandwidths.

In such a radio communications system, one communication device may send some control signals to another communication device. These control signals convey information about, for example, which radio resources and modulation-coding scheme to use to transmit data, so that the latter communication device can receive and decode data properly with reference to this information. The control signals may also specify which radio resources and modulation-coding scheme the latter communication device is supposed to use when it transmits data to the former communication device.

The length of control signals is not always fixed. For example, some systems define a plurality of control signal formats with different signal lengths, so that an appropriate format can be selected depending on the purpose of control signals. Another example is a radio communications system in which the length of control signals varies in accordance with the bandwidth of the frequency band that it uses for data transmission. See, for example, 3rd Generation Partnership Project, "Evolved Universal Terrestrial Radio Access (E-UTRA); Multiplexing and channel coding", 3GPP TS 36.212 V9.0.0, 2009-12, Section 5.3.3.1.

In the case of variable-length control signals, blind decoding of received signals may be performed in the receiving end. That is, the receiving communication device is unaware of the detailed channel structure and thus makes a plurality of attempts to decode a received signal with different candidates for the length that the control signal may take. This is referred to as blind decoding. When a successful decoding attempt is reached, the receiving communication device considers it as detection of a control signal. To detect such control signals, the receiving communication device monitors a specific region of radio resources (referred to as a search space) previously defined in accordance with prescribed rules. See, for example, 3rd Generation Partnership Project, "Evolved Universal Terrestrial Radio Access (E-UTRA); Physical layer procedures", 3GPP TS 36.213 V9.0.1, 2009-12, Section 9.1.1.

Some radio communications systems are designed to use a plurality of frequency bands in a parallel fashion to transmit data. These individual frequency bands are called "component carriers." A method under study further enables such systems to transmit a control signal and its associated data signals by using different frequency bands. This method, sometimes referred to as the cross-carrier scheduling, provides a carrier indicator field (CIF) to permit a single frequency band to convey control signals for a plurality of frequency bands. See, for example, 3rd Generation Partnership Project, "Way Forward on PDCCH for Bandwidth Extension in LTE-A", R1-093699, 3GPP TSG RAN WG1 Meeting58, 2009-08.

In the case where a plurality of frequency bands are used in data communication, a plurality of control signals corresponding to these frequency bands are transmitted with one or more of those frequency bands. The receiving devices try several candidates for the control signal length in extracting information from a search space in which control signals are expected to reside. The candidates may vary depending on for which frequency band the control signals are intended. While it is possible to specify different frequency bands to send different control signals, this frequency scheduling leads to an increase in the number of candidates for the control signal length. As a result, an increased burden of control signal extraction would be imposed on the receiving radio communication devices.

SUMMARY

According to an aspect of the embodiments to be discussed herein, there is provided a radio communication method for first and second radio communication apparatuses to communicate with each other by using a plurality of frequency bands including first and second frequency bands. This method includes: determining, by the first radio communication apparatus, whether to use one frequency band or more than one frequency band to transmit a first control signal and a second control signal, based on bandwidths of the first and second frequency bands, the first control signal carrying information to be used in communication performed with the first frequency band, the second control signal carrying information to be used in communication performed with the second frequency band; transmitting, by the first radio communication apparatus, the first and second control signals by using one or more of the frequency bands depending on a result of the determining; selecting, by the second radio communication apparatus, common candidates for signal length that are applicable to both the first control signal and second control signal, based on the bandwidths of the first and second frequency bands, when the first and second control signals are transmitted with one frequency band; and detecting, by the second radio communication apparatus, the first and second control signals by attempting signal extraction from received signals with each of the common candidates for the signal length.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 6 illustrates the number of candidates for PDCCH included in a search space;

FIG. 7 illustrates which DCI format may be used in common search spaces;

FIG. 8 illustrates which DCI format may be used in UE-specific search spaces;

FIG. 9 illustrates the DCI format size versus bandwidth;

FIG. 10 summarizes what information is sent from a base station to mobile stations;

FIG. 15 illustrates an example of grouping of component carriers;

FIG. 26 is a flowchart of base station control according to a sixth embodiment.

DESCRIPTION OF EMBODIMENTS

Figure 1:
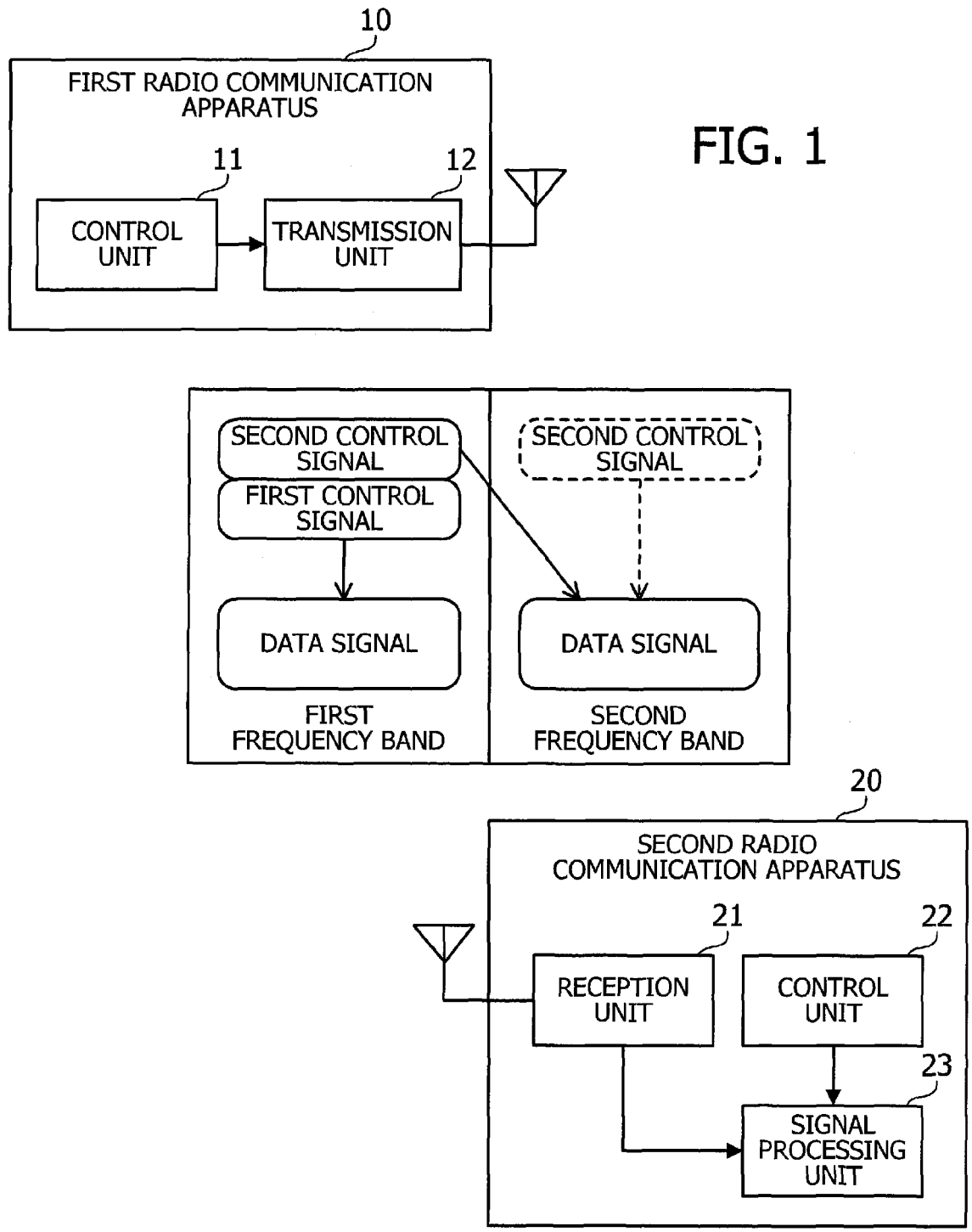
FIG. 1 illustrates a radio communications system according to a first embodiment.

Several embodiments will be described in detail below with reference to the accompanying drawings, wherein like reference numerals refer to like elements throughout.

(a) First Embodiment

FIG. 1 illustrates a radio communications system according to a first embodiment. The illustrated radio communications system includes a first radio communication apparatus 10 and a second radio communication apparatus 20. For example, the first radio communication apparatus 10 may be a base station or a relaying station, and the second radio communication apparatus 20 may be a mobile station. The first and second radio communication apparatuses 10 and 20 communicate with each other wirelessly by using a plurality of frequency bands including first and second frequency bands. The first radio communication apparatus 10 sends control signals to the second radio communication apparatus 20.

The first radio communication apparatus 10 includes a control unit 11 and a transmission unit 12. The control unit 11 determines which frequency band(s) to use to transmit first and second control signals. The first control signal carries information to be used in communication performed with the first frequency band, and the second control signal carries information to be used in communication performed with the second frequency band. Specifically, the control unit 11 determines whether to use just one frequency band or more than one frequency band to send such first and second control signals. The former option means that both the two control signals are in a search space provided in that single frequency band. The latter option means that the two control signals are in different search spaces. The control unit 11 makes this decision with reference to at least the bandwidths of the first and second frequency bands. Based on this determination of the control unit 11, the transmission unit sends first and second control signals to the second radio communication apparatus 20 by using one frequency band or two different frequency bands.

The second radio communication apparatus 20 includes a reception unit 21, a control unit 22, and a signal processing unit 23. The reception unit 21 receives signals including the first and second control signals noted above from the first radio communication apparatus 10. The length of the first and second signals actually depends on the way in which they are transmitted. The control unit 22 determines their possible lengths (i.e., candidates for signal length), so as to extract the first and second control signals from the received signals. More specifically, the control unit 22 selects common candidates for the signal length that are applicable to both the first and second control signals, when these two signals are transmitted with one frequency band (or in one search space of that frequency band). The control unit 22 performs this candidate selection on the basis of bandwidths of the first and second frequency bands. The signal processing unit 23 detects first and second control signals by attempting signal extraction from the received signals with at least each of the common candidates that the control unit 22 has selected.

The candidates for the control signal length may depend on the bandwidth of frequency bands with which radio communication is performed by using those control signals. This means that the number of such candidates per frequency band may be reduced by taking into consideration the bandwidth of each frequency band when determining which frequency bands to use for transmission of control signals. For example, the control unit 11 may choose to use just one frequency band (or one search space provided in that frequency band) for transmission of first and second control signals when the first and second frequency bands are equal in bandwidth. In this case, the first and second control signals may be transmitted with the first frequency band or the second frequency band, or some other frequency band.

The candidates for the control signal length may also depend on transmission mode in which radio communication is performed in accordance with the control signal. The control unit 11 may thus take transmission mode into account, in addition to bandwidth, in determining which frequency bands to use for transmission of control signals. For example, the control unit 11 may choose to use one frequency band (or one search space provided in that frequency band) for transmission of first and second control signals when the first and second frequency bands are equal, not only in bandwidth, but also in transmission mode. In this case, the control unit 22 may determine common candidates for the signal length, considering both the bandwidth and transmission mode.

Transmission mode defines how to transmit data and is selected from among a plurality of options that are provided previously. Each different transmission mode is defined as a collection of schemes for the transmit diversity, multiple-input multiple-output (MIMO), radio resource allocation, transmission of pilot signals, and others. For example, the transmission mode options may include those defined in the Long Term Evolution (LTE) and LTE-Advanced (LTE-A) specifications. It is possible to use different transmission modes in different frequency bands. In the case where the first radio communication apparatus 10 communicates with a plurality of other radio communication apparatuses, the transmission mode may be selected individually for the latter apparatuses.

In operation of the above-described radio communications system of the first embodiment, the first radio communication apparatus 10 determines whether to use just one frequency band or more than one frequency band to send first and second control signals, on the basis of bandwidth of the first and second frequency bands. Depending on this determination result, the first radio communication apparatus 10 transmits first and second control signals by using one frequency band or more frequency bands. In the case of one frequency band, the second radio communication apparatus 20 selects common candidates for signal length that are applicable to both the first and second control signals, based on the respective bandwidths of the first and second frequency bands. The second radio communication apparatus 20 then detects first and second control signals by attempting signal extraction from the received signals with at least the selected common candidates.

The above-described features of the first embodiment make it possible to limit the increase of signal length candidates per frequency band, in the case where the length of control signals may vary. The second radio communication apparatus 20 has only to execute a limited number of trials in its signal extraction (e.g., blind decoding). The first embodiment thus alleviates the burden on the second radio communication apparatus 20.

The decision on whether to use a single frequency band or multiple frequency bands to transmit first and second control signals is made on the basis of the bandwidth of their corresponding frequency bands. It is, therefore, more likely that the first and second control signals will have common signal length candidates when they are transmitted with a single frequency band. With the commonality of candidates, the second radio communication apparatus 20 can reduce the number of signal extraction operations because a single set of attempts apply to both the first and second control signals.

The following second to fifth embodiments are each directed to an LTE-A mobile communications system as an exemplary implementation of the above-described radio communications system according to the first embodiment. The first embodiment is, however, not limited to such implementations, but can also be applied to other types of mobile communications systems, as well as to fixed wireless communications systems.

(b) Second Embodiment

Figure 2:
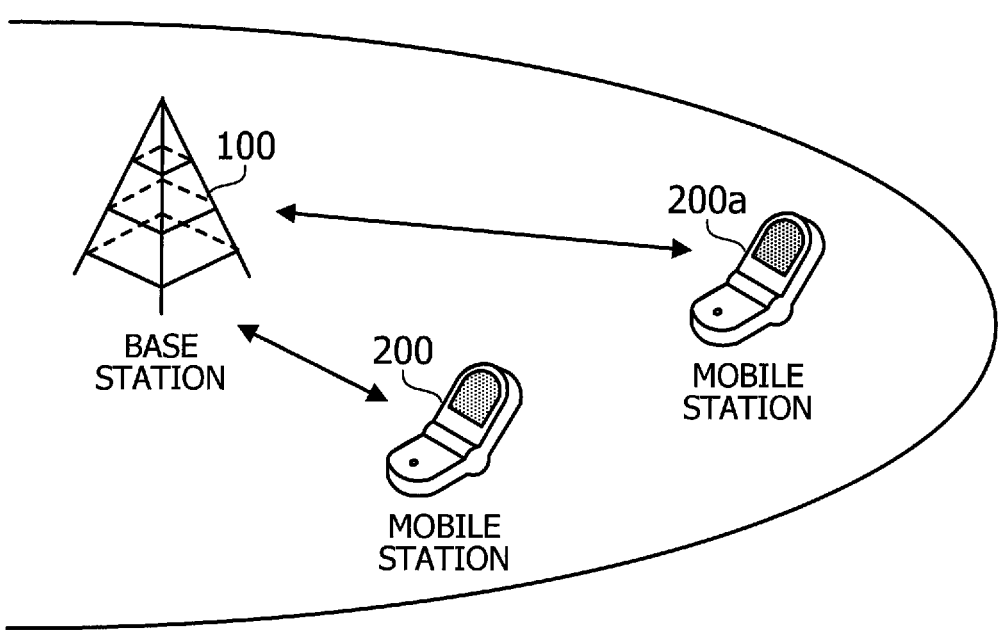
FIG. 2 illustrates a mobile communications system according to a second embodiment.

FIG. 2 illustrates a mobile communications system according to a second embodiment. The illustrated mobile communications system includes a base station 100 and mobile stations 200 and 200a. The base station 100 is a radio communication apparatus that wirelessly communicates with mobile stations 200 and 200a. The base station 100 is linked to an upper-level wired network (not illustrated) to transfer data between that network and the mobile stations 200 and 200a. As will be described later, the base station 100 is allowed to use a plurality (e.g., five) of frequency bands called "component carriers" (CC).

The mobile stations 200 and 200a are radio communication apparatuses (e.g., mobile phones and personal digital assistants) designed to connect to their associated base station 100 to perform radio communication. The mobile stations 200 and 200a transmit data to and receive data from the base station 100. Links in the direction from a base station to mobile stations may be referred to as "downlink" (DL). Links in the direction from mobile stations to their base station may be referred to as "uplink" (UL). The mobile stations 200 and 200a use some or all of their five CCs in their communication with the base station 100. The combined use of a plurality of CCs for an increased bandwidth may be referred to as "carrier aggregation."

The base station 100 is considered to be an example of the first radio communication apparatus 10 in the foregoing first embodiment. The mobile stations 200 and 200a are considered to be an example of the second radio communication apparatus 20 in the first embodiment. While the following description will discuss interactions between such mobile stations 200 and 200a and their associated base station, the second embodiment is not limited by this specific example, but may also be applied to the case in which the mobile stations 200 and 200a are connected to a relaying station. When this is the case, control signals (described later) are exchanged between the relaying station and mobile stations 200 and 200a.

Figure 3:
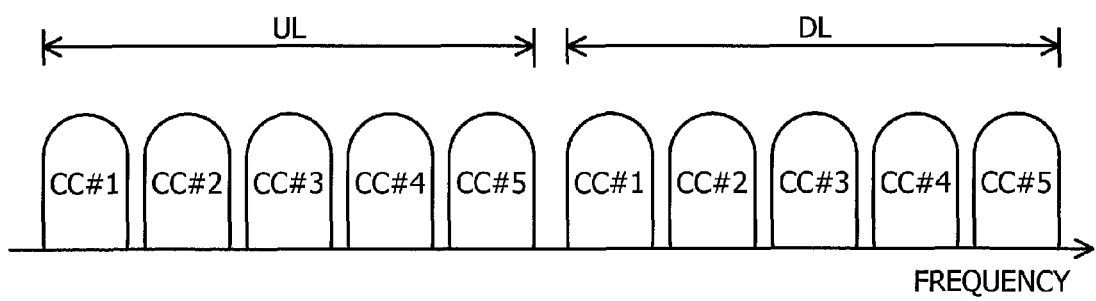
FIG. 3 illustrates an exemplary arrangement of component carriers.

FIG. 3 illustrates an exemplary arrangement of component carriers. For example, the base station 100 is allowed to use up to five CCs (CC#1 to CC#5) to communicate with mobile stations 200 and 200a. Bidirectional communication may be realized by using the frequency-division duplex (FDD) scheme or time-division duplex (TDD) scheme. In the case of FDD, two sets of such CCs #1 to #5 are allocated, one for downlink and the other for uplink. The term "CC" may refer to a pair of frequency bands for downlink and uplink. In the case of TDD, five CCs are allocated for shared use in the downlink and uplink directions. FIG. 3 illustrates the case where the FDD scheme is used.

The base station 100 determines the bandwidth of each CC#1 to #5, taking into consideration the number of mobile stations to be served, the bitrates to be provided, and other relevant factors. More specifically, the respective bandwidths of CC#1 to CC#5 are selected from among 1.4 MHz, 3 MHz, 5 MHz, 10 MHz, 15 MHz, and 20 MHz. The five CCs #1 to #5 may have different bandwidths or a unified bandwidth. The base station 100 manages the allocation of radio resources for each individual CC#1 to #5.

Figure 4:
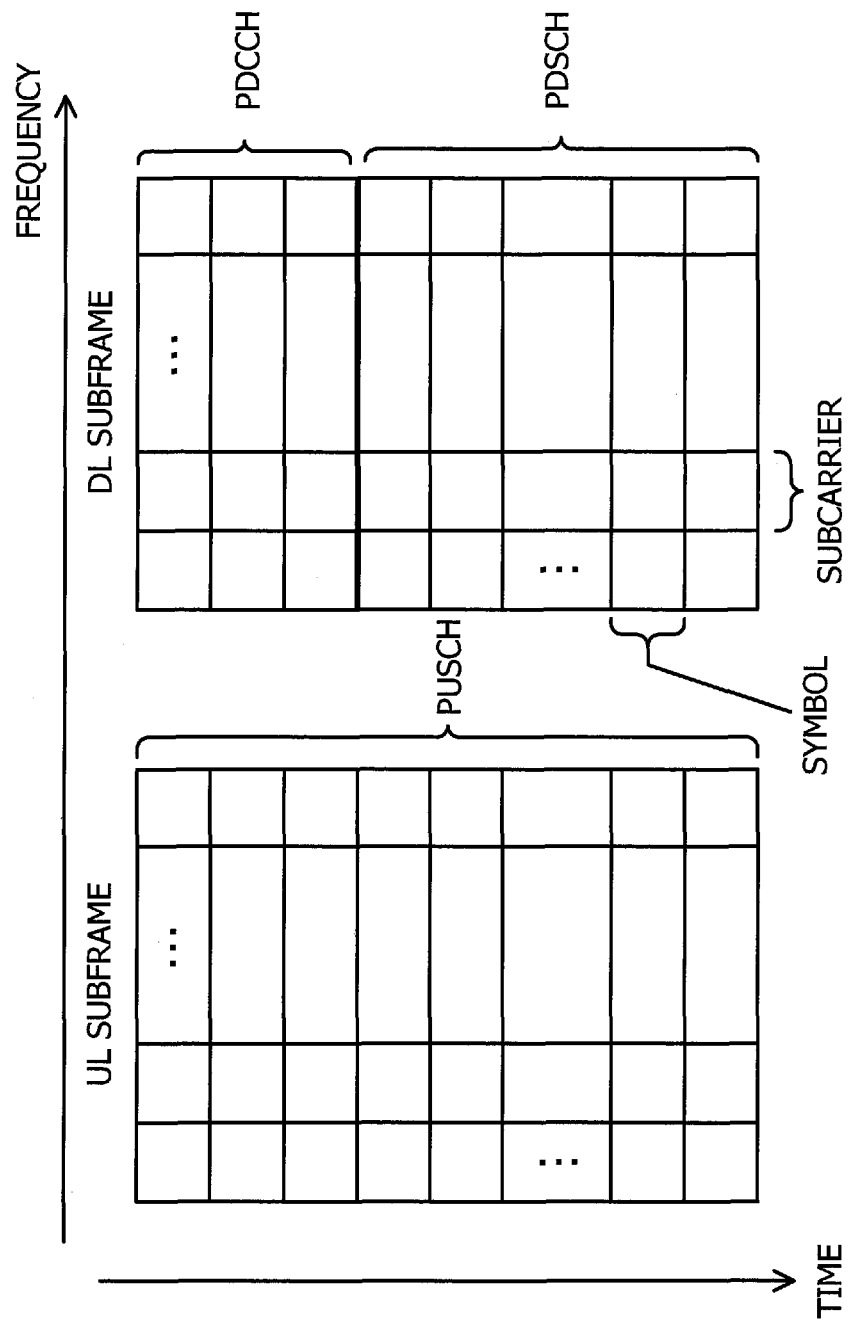
FIG. 4 illustrates an exemplary structure of radio frames.

FIG. 4 illustrates an exemplary structure of radio frames. The base station 100 and mobile stations 200 and 200a exchange radio frames with each CC. One radio frame is formed from a plurality of subframes (e.g., ten subframes).

The base station 100 manages radio resources on an individual subframe basis. Radio resources are divided in both the frequency-axis direction and time-axis direction. The minimum units in the frequency-axis direction are subcarriers, while those in the time-axis direction are symbols. For example, Single-Carrier Frequency-Division Multiple Access (SC-FDMA) is used as a multiple access scheme for UL subframes. For DL subframes, Orthogonal Frequency-Division Multiple Access (OFDMA) is used.

UL subframes include a region for Physical Uplink Shared Channel (PUSCH). DL subframes, on the other hand, have a region for Physical Downlink Shared Channel (PDSCH) and a region for Physical Downlink Control Channel (PDCCH). The PDCCH region is located in the topmost N symbols of DL subframe, where N may vary in the range of 1 to 3 or 2 to 4, depending on the bandwidth of CC. The PDSCH region is located in the remaining symbols that follow the PDCCH.

PUSCH is a physical channel for use by mobile stations 200 and 200a to transmit their user data and control information to the base station 100. The mobile stations 200 and 200a may be allocated such PUSCH for their individual use. A single UL subframe can be configured to provide PUSCH for a plurality of mobile stations with the frequency-division multiplexing scheme. The base station 100 dynamically configures PUSCH by allocating radio resources of UL subframes to the mobile stations 200 and 200a.

PDSCH is a physical channel for use by the base station 100 to transmit user data and control information of its upper layer to the mobile stations 200 and 200a. The mobile stations 200 and 200a may be allocated such PDSCH for their individual use. A single DL subframe can be configured to provide PDSCH for a plurality of mobile stations with the orthogonal frequency-division multiplexing scheme. The base station 100 dynamically configures PDSCH by allocating radio resources of DL subframes to the mobile stations 200 and 200a.

PDCCH is a physical channel for use by the base station 100 to transmit Layer-1 (L1) and Layer-2 (L2) control signals to the mobile stations 200 and 200a. The control signals transmitted with PDCCH may include those related to PUSCH and PDSCH. Specifically, the PUSCH-related control information indicates, among others, radio resources used to provide PUSCH, data format such as a modulation and coding scheme (MCS), and uplink retransmission control according to Hybrid Automatic Repeat Request (HARQ). The PDSCH-related control information indicates, among others, radio resources used to provide PDSCH, data format, and downlink retransmission control.

PDCCH is provided individually for PUSCH and PDSCH. That is, PUSCH-related control signals and PDSCH-related control signals are transmitted by using different PDCCHs. Further, control signals for different mobile stations are transmitted by using different PDCCHs. A single DL subframe can be configured to provide a plurality of PDCCHs with the orthogonal frequency-division multiplexing scheme. The mobile stations 200 and 200a monitor PDCCH regions in CC that may convey control signals addressed thereto, thereby detecting control signals related to their respective PUSCH and PDSCH.

Figure 5:
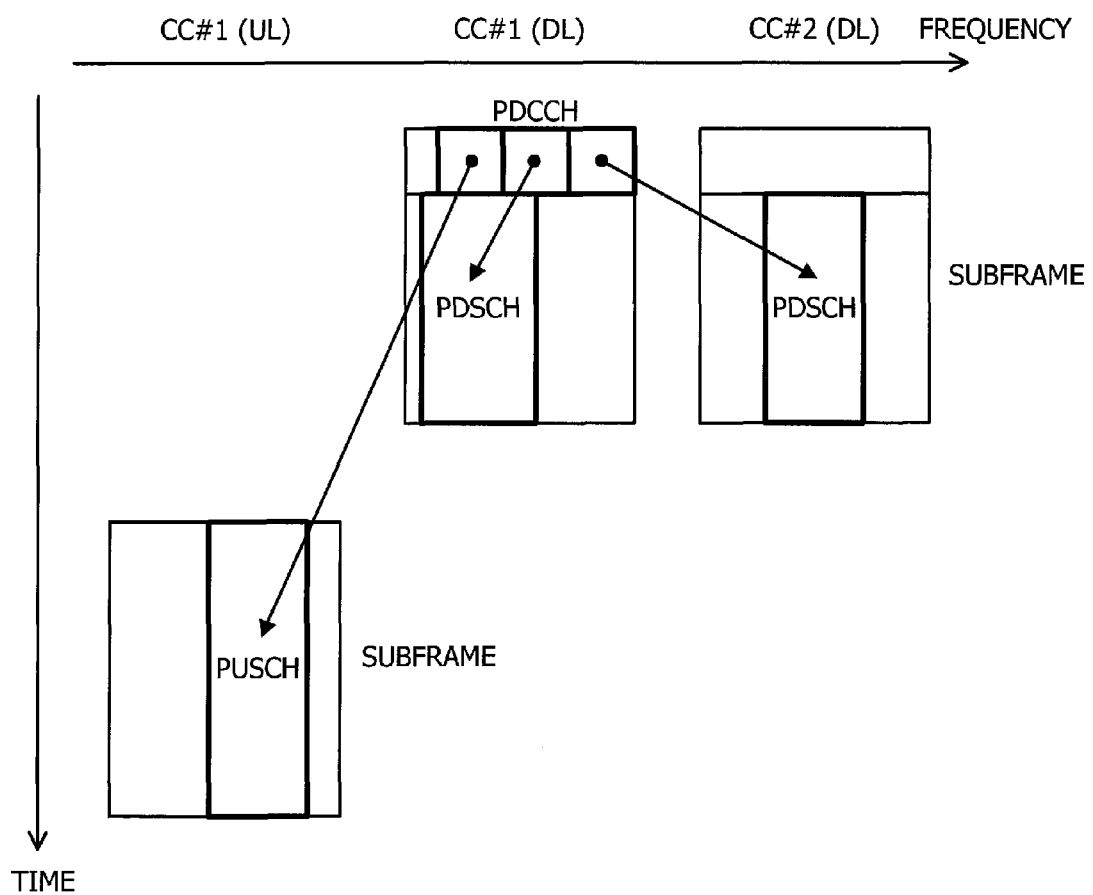
FIG. 5 illustrates an exemplary configuration of PDSCH, PUSCH, and PDCCH.

FIG. 5 illustrates an exemplary configuration of PDSCH, PUSCH, and PDCCH. This example assumes that PDSCH, PUSCH, and PDCCH are set up for one mobile station 200. The mobile station 200 receives data from the base station 100 by using two CCs #1 and #2 and transmits data to the base station 100 by using one CC#1. More specifically, two PDSCHs for the mobile station 200 are established in downlink CC#1 and CC#2, while one PUSCH for the same is established in uplink CC#1. The mobile station 200 also receives control signals from the base station 100 via CC#1. That is, PDCCHs for the mobile station 200 are established in downlink CC#1. The mobile station 200 monitors its associated PDCCH region in CC#1 to detect PDCCH control signals that the mobile station 200 is supposed to receive.

In the illustrated example, one PDCCH region contains three PDCCHs. Specifically, one PDCCH corresponds to PDSCH in the same subframe, and another PDCCH corresponds to PDSCH in a subframe that is transmitted in downlink CC#2 at the same time as the noted CC#1 subframe. Yet another PDCCH corresponds to PUSCH in a separate subframe that is transmitted in uplink CC#1 a predetermined time (e.g., four subframe intervals) after the noted subframe in downlink CC#1. The mobile station 200 monitors the above PDCCH region to detect those three PDCCHs established for the mobile station 200 itself and uses the detected information to control reception of two PDSCHs and transmission of one PUSCH.

As can be seen from the above example, a PDCCH region can convey control signals concerning physical channels of CCs that are different from the CC to which the PDCCH region belongs. In other words, the mobile communications system of the second embodiment permits cross-carrier scheduling. Another mobile station 200a is also allocated its PDSCH, PUSCH, and PDCCH similarly to the above-described mobile station 200. It is possible, in this case, to place PDCCHs of one mobile station 200a in one or more CCs that are different from those used for PDCCHs of the other mobile station 200. Such a set of CCs for PDCCHs of each individual mobile station is referred to herein as a "monitoring set." It may also be possible, however, for a single CC to provide PDCCHs of both mobile stations 200 and 200a.

Transmission mode is set individually for the CCs used for data communication Eight kinds of transmission modes are defined for different purposes, which are referred to as transmission mode 1 to transmission mode 8. More specifically, each transmission mode defines whether to use transmit diversity, whether to use MIMO, how to allocate radio resources, how to transmit pilot signals, and other things. Transmission mode may be selected independently for different mobile stations 200 and 200a. Briefly, transmission modes 1 to 8 are described as follows.

(1) In transmission mode 1, data communication is performed with a single antenna port.

(2) In transmission mode 2, transmit diversity is used.

(3) In transmission mode 3, large-delay cyclic delay diversity (large-delay CDD) or transmit diversity is used. CDD realizes the gain of frequency diversity by cyclically shifting OFDM symbols.

(4) In transmission mode 4, closed-loop spatial multiplexing is performed.

(5) In transmission mode 5, multiuser MIMO is executed.

(6) In transmission mode 6, closed-loop spatial multiplexing is performed by using a single transmission layer.

(7) In transmission mode 7, either single-antenna-port data communication or transmit diversity is used depending on the number of antenna ports for transmission of physical broadcast channels (PBCH).

(8) In transmission mode 8, single-antenna-port data communication, transmit diversity, dual-layer transmission, and the like are supported and used depending on the number of antenna ports for PBCH transmission and other conditions. Dual-layer transmission is a transmission scheme that forms a beam of each DL transmission signal by taking advantage of information on the angle of arrival of UL signals received from two mobile stations communicating in a multiplexed way.

As mentioned above, the mobile stations 200 and 200a detect their respective PDCCHs. This is achieved in the following way. First, a specific space of radio resources is defined for the purpose of efficient monitoring and PDCCH detection by the mobile stations 200 and 200a. This space is called a "search space." The search space actually includes a common search space for sending common control signals to a plurality of mobile station, and a UE-specific search space (UE stands for "User Equipment") for sending control signals dedicated to a particular mobile station. The mobile stations 200 and 200a monitor their respective UE-specific search spaces, in addition to the common search space.

FIG. 6 illustrates the number of candidates for PDCCH included in a search space. Aggregation levels are defined as part of the method for placing a plurality of PDCCHs in a single search space. Specifically, one of two aggregation levels is selected for a common search space. In the case of aggregation level=4, the search space is sized to sixteen Control Channel Elements (CCE) in total, so that each PDCCH region uses four CCEs. In other words, this aggregation level permits transmission of up to four PDCCHs. Similarly, up to two PDCCHs can be transmitted in the case of aggregation level=8.

For a UE-specific search space, on the other hand, an aggregation level is selected from among four choices. Specifically, in the case of aggregation level=1, the search space is sized to six CCEs in total, so that each PDCCH uses one CCE. This means that this aggregation level permits transmission of up to six PDCCHs. Similarly, up to six PDCCHs can be transmitted in the case of aggregation level=2. In the case of aggregation level=4 or 8, up to two PDCCHs can be transmitted.

The mobile stations 200 and 200a initially have no information about the aggregation level of each search space, thus being unable to figure out how a plurality of PDCCHs are inserted in a search space. For this reason, the mobile stations 200 and 200a try some possible patterns as follows. For their common search space, the mobile stations 200 and 200a extract six (=4+2) possible PDCCHs (referred to as "PDCCH candidates") from signals in the search space, assuming the above-noted two aggregation levels. For their UE-specific search spaces, the mobile stations 200 and 200a extract sixteen (=6+6+2+2) PDCCH candidates from signals in the search space, assuming the above-noted four aggregation levels. The mobile stations 200 and 200a then execute blind decoding for each extracted PDCCH candidate.

The PDCCH follows the specifications of Downlink Control Information (DCI) formats 0, 1, 1A, 1B, 1C, 1D, 2, 2A, 2B, 3, and 3A. One of these DCI formats is selected depending on the purpose of control signals to be carried by PDCCH. Brief descriptions for the usage of each DCI format are provided below.

(0) DCI format 0 is used for scheduling of PUSCH.

(1) DCI format 1 is used for normal scheduling of PDSCH. This DCI format 1 can handle radio resources arranged discontinuously.

(1A) DCI format 1A is used for compact scheduling of PDSCH. Compact scheduling is a scheme for scheduling a succession of radio resources by specifying its start position and size. This DCI format 1A may be chosen to initiate random access.

(1B) DCI format 1B is used for compact scheduling of PDSCH in the case where the control information includes precoding information. The term "precoding" refers to the act of applying linear processing on transmission signals at the sending end of MIMO communication, according to the condition of propagation paths.

(1C) DCI format 1C is used for compact scheduling of PDSCH which sends the control information with a smaller data size than in the case of DCI format 1A.

(1D) DCI format 1D is used for compact scheduling of PDSCH in the case where the control information includes both precoding information and power offset data.

(2) DCI format 2 is used for scheduling of PDSCH when closed-loop MIMO is executed.

(2A) DCI format 2A is used for scheduling of PDSCH when open-loop MIMO is executed.

(2B) DCI format 2B is used for scheduling of PDSCH when dual-layer transmission is executed.

(3) DCI format 3 is used for sending two-bit Transmission Power Control (TPC) commands to mobile stations.

(3A) DCI format 3A is used for sending one-bit TPC commands to mobile stations.

The base station 100 assigns Radio Network Temporary Identifiers (RNTIs) to each mobile station 200 and 200b and scrambles control signals of PDCCH by using a scramble sequence associated with that RNTI. Several kinds of RNTIs are defined for different usages, which include: SI-RNTI, P-RNTI, RA-RNTI, C-RNTI, SPS C-RNTI, Temporary C-RNTI, TPC-PUCCH-RNTI, and TPC-PUSCH-RNTI. PUCCH denotes "Physical Uplink Control Channel." Brief description of these identifiers will be provided below.

SI-RNTI is used to transmit system information. P-RNTI is used when paging a mobile station. RA-RNTI is for random access. C-RNTI is assigned to each mobile station that is currently connected to the base station and used in their normal data communication. SPS C-RNTI is used in data transmission according to persistent scheduling. Persistent scheduling is a scheduling scheme that allocates radio resources with a fixed interval, which is applicable when the communication is of an intermittent nature as in the case of voice communication. Temporary C-RNTI is used during the initial random-access communication before C-RNTI is formally assigned. TPC-PUCCH-RNTI and TPC-PUSCH-RNTI are used in transmission of TPC commands related to PUCCH and PUSCH, respectively.

FIG. 7 illustrates which DCI format may be used in a common search space. A common search space may contain PDCCHs configured in DCI format 0, 1A, 1C, 3, or 3A. It is noted that these DCI formats 0, 1A, 1C, 3, and 3A are independent of which transmission mode is specified.

DCI format 0 is subject to scrambling based on C-RNTI, SPS C-RNTI, or Temporary C-RNTI, as indicated by the leftmost three circles in FIG. 7. Similarly, DCI format 1A is subject to scrambling based on SI-RNTI, P-RNTI, RA-RNTI, C-RNTI, SPS C-RNTI, or Temporary C-RNTI. DCI format 1C is subject to scrambling based on SI-RNTI, P-RNTI, or RA-RNTI. DCI formats 3 and 3A are subject to scrambling based on TPC-PUCCH-RNTI or TPC-PUSCH-RNTI.

The mobile stations 200 and 200a search their common search space to find PDCCH in DCI formats 0, 1A, 3, and 3A, no matter which transmission mode is specified. The upper layer may specify that PDCCH in subframes be decoded by using one of SI-RNTI, P-RNTI, and RA-RNTI. For such subframes, the mobile stations 200 and 200a search for PDCCH in DCI format 1C, regardless of transmission mode.

FIG. 8 illustrates which DCI format may be used in a UE-specific search space. A UE-specific search space may contain PDCCHs in DCI format 0, 1, 1A, 1B, 1D, 2, 2A, or 2B. It is noted that DCI formats 0 and 1A can be used independently of transmission mode, as indicated by the circles in FIG. 8. In contrast to these, DCI formats 1, 1B, 1D, 2, 2A, and 2B are used to send control signals in particular transmission modes, as indicated by the triangles in FIG. 8. More specifically, DCI format 1 is used in transmission modes 1, 2, and 7. DCI format 1B is used in transmission mode 6. DCI format 1D is used in transmission mode 5. DCI format 2 is used in transmission mode 4. DCI format 2A is used in transmission mode 3. DCI format 2B is used in transmission mode 8.

DCI formats 0, 2, 2A, and 2B are subject to scrambling based on C-RNTI or SPS C-RNTI. DCI formats 1 and 1A are subject to scrambling based on C-RNTI, SPS C-RNTI, or Temporary C-RNTI. DCI formats 1B and 1D are subject to scrambling based on C-RNTI.

The mobile stations 200 and 200a search their respective UE-specific search spaces to find PDCCH in DCI formats 0 and 1A, no matter which transmission mode is set. The mobile stations 200 and 200a also search their respective UE-specific search spaces to find PDCCH in DCI format 1, 1B, 1D, 2, 2A, or 2B, depending on which transmission mode is used for the CCs with which they are performing data communication.

FIG. 9 illustrates the DCI format size versus bandwidth. The payload length of PDCCH depends on the DCI format used and the bandwidth of CC used in data communication to which the control signals are applied. Basically, the wider the bandwidth, the longer the payload. Each table cell of FIG. 9 indicates the number of payload bits in the case of FDD. The number of payload bits includes Cyclic Redundancy Check (CRC) bits and 3-bit CIF. The exception is that DCI format 1C does not include CIF because of the following agreements as to cross-carrier scheduling in the LTE-A:

(1) CIF is not to be included in DCI formats that scramble CRC on the basis of P-RNTI, RA-RNTI, SI-RNTI, or Temporary C-RNTI.

(2) CIF may be included in DCI formats 0, 1, 1A, 1B, 1D, 2, 2A, and 2B for UE-specific search spaces where CRC is scrambled on the basis of C-RNTI or SPS C-RNTI.

(3) CIF is not to be included in DCI formats 0 and 1A for a common search space in which CRC is scrambled on the basis of C-RNTI or SPS C-RNTI.

That is, cross-carrier scheduling is not performed with PDCCH in a common search space. This is why the size of DCI format 1C does not include CIF in the example seen in FIG. 9.

Referring to FIG. 9, the symbol "RB" denotes "resource blocks." Six RB are equivalent to 1.4 MHz. Fifteen RB are equivalent to 3 MHz. Twenty-five RB are equivalent to 5 MHz. Fifty RB are equivalent to 10 MHz. Seventy-five RB are equivalent to 15 MHz. One hundred RB are equivalent to 20 MHz. It is noted that the payload length of DCI formats 1B, 1D, 2, and 2A may vary depending on the number of antenna ports that the base station 100 uses for its data transmission. Specifically, the non-parenthesized figures of those DCI formats in FIG. 9 indicate the numbers of payload bits in the case of two antenna ports. The parenthesized figures of the same indicate the numbers of payload bits in the case of four antenna ports.

As can be seen from FIG. 9, DCI formats 0, 1A, 3, and 3A have similar, but not exactly the same payload lengths when they are compared in each particular bandwidth. The base station 100, however, unifies their apparent payload lengths by adding padding bits when transmitting PDCCH. This means that the receiving mobile stations 200 and 200a can perform blind decoding on the signals in DCI formats 0, 1A, 3, and 3A in a unified manner.

Based on the details described above in FIGS. 6 to 9, the following section will now discuss how many times the mobile stations 200 and 200a perform blind decoding to detect PDCCH. For simplicity, it is assumed that the mobile stations 200 and 200a use only one CC for communication.

The mobile stations 200 and 200a decode PDCCH in their common search space, assuming five possible DCI formats 0, 1A, 1C, 3, and 3A, regardless of transmission mode. Because of the equal signal lengths of DCI formats 0, 1A, 3, and 3A, there are two signal length candidates per PDCCH. Specifically, one candidate is determined from the combination of DCI format 0 and the bandwidth, and the other is determined from the combination of DCI format 1C and the bandwidth. Since there are six PDCCH candidates to be extracted from the common search space, the mobile stations 200 and 200a are supposed to repeat blind decoding up to 12 times (i.e., 2×6=12).

The mobile stations 200 and 200a also decode PDCCH in their respective UE-specific search spaces, assuming two DCI formats 0 and 1A, regardless of transmission mode. Because of the equal signal lengths of these DCI formats 0 and 1A, there is one candidate for the signal length which is determined from the combination of DCI format 0 and the bandwidth. The mobile stations 200 and 200a further decode PDCCH in their respective UE-specific search spaces, assuming one of DCI formats 1, 1B, 1D, 2, 2A, and 2B which is determined from the transmission mode. This provides another candidate for the signal length which is determined from the combination of a DCI format associated with the transmission mode and the bandwidth. Since there are sixteen PDCCH candidates to be extracted from a UE-specific search space, the mobile stations 200 and 200a are supposed to repeat blind decoding up to 32 times (i.e., (1+1)×16=32).

According to the above calculations, the mobile stations 200 and 200a repeat blind decoding on the same received signals up to 44 (=12+32) times even in this single-CC communication. The number of such repetitions may further be increased in the case of cross-carrier scheduling, since there will be more combinations of transmission mode and bandwidth than in the case of single CC discussed above. The following section will describe how to control and reduce the repetition of blind decoding in mobile stations 200 and 200a.

FIG. 10 summarizes what information is sent from a base station to mobile stations. More specifically, FIG. 10 illustrates information that the base station 100 sends to mobile stations 200 and 200a for use by the receiving mobile stations 200 and 200a in performing blind decoding of PDCCH. This information may include broadcast information and dedicated information. The broadcast information is directed to every mobile station 200 and 200a, whereas the dedicated information is addressed to a particular mobile station 200 or 200a.

The broadcast information includes parameters that indicate the central frequency and bandwidth of each downlink CC #1 to #5. Also included in the broadcast information are parameters that indicate the central frequency and bandwidth of each uplink CC #1 to #5. The base station 100 sends bandwidth information of downlink CCs #1 to #5 by using their respective broadcast channels (PBCH), and sends frequency and bandwidth information of uplink CCs #1 to #5 by using a data channel (PDSCH) associated with relevant PDCCH. It is noted that the central frequencies of downlink CCs #1 to #5 may be broadcast to mobile stations 200 and 200a through PDSCH or, alternatively, may be detected by the individual mobile stations 200 and 200a through their own cell search operation. The content of broadcast information does not depend on its destination mobile stations.

As will be described later, CC#1 to CC#5 are sorted into groups, each with a specific identifier. The dedicated information includes, among others, the identifier of a CC group and carrier indicators (CI) that are assigned to CC#1 to CC#5 individually. The dedicated information also includes the identifiers of "monitoring CCs" (i.e., CCs constituting a monitoring set), the identifiers of "communication CCs" (i.e., CCs to be used for data communication), information indicating association between those monitoring CCs and communication CCs, and the numbers indicating transmission mode of each communication CC. The base station 100 transmits such dedicated information to the mobile stations 200 and 200a through a data channel (PDSCH). The content of dedicated information may differ from mobile station to mobile station.

Figure 11:
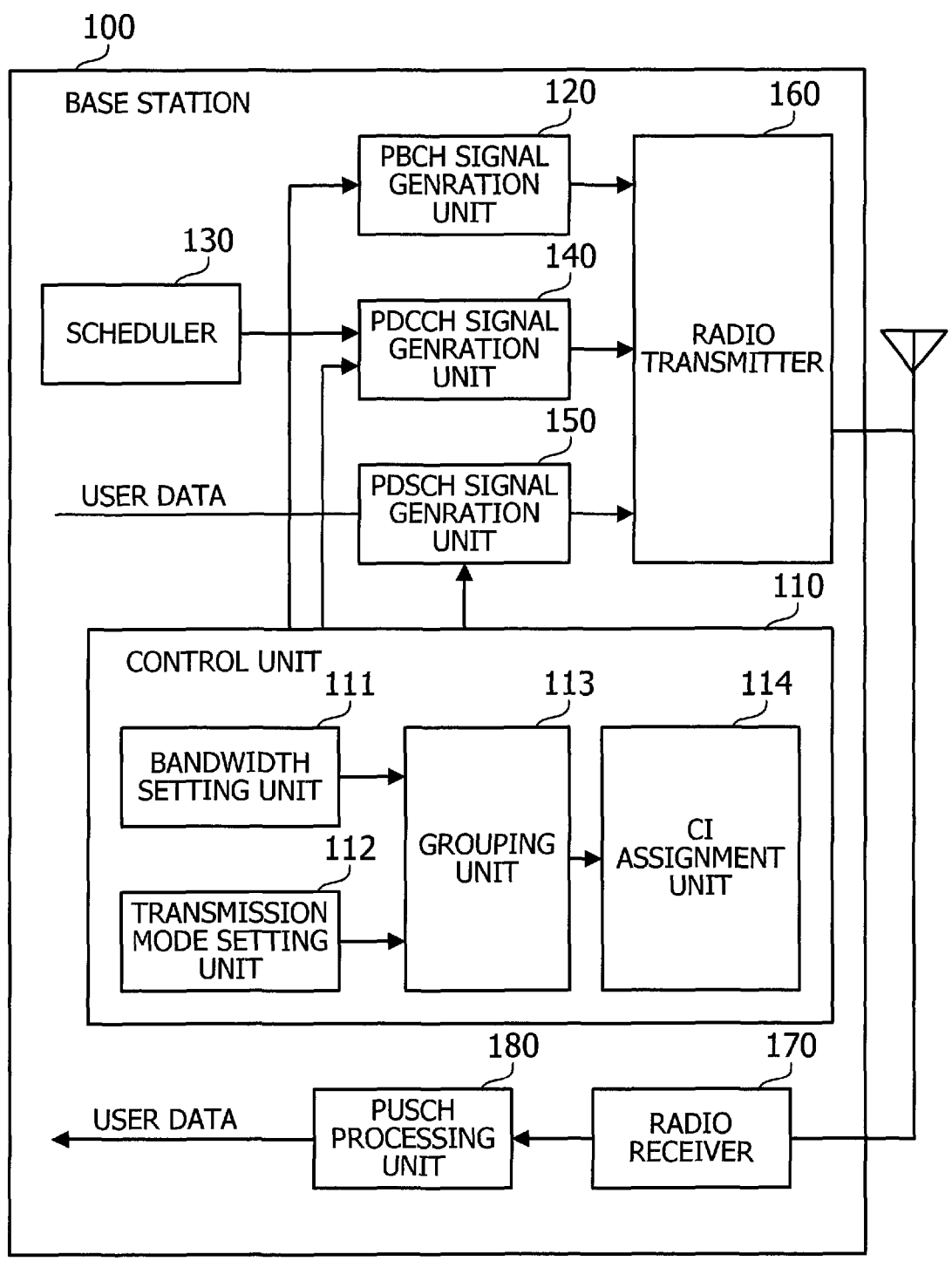
FIG. 11 is a block diagram of a base station.

FIG. 11 is a block diagram of a base station. The illustrated base station 100 includes a control unit 110, a PBCH signal generation unit 120, a scheduler 130, a PDCCH signal generation unit 140, a PDSCH signal generation unit 150, a radio transmitter 160, a radio receiver 170, and a PUSCH processing unit 180.

The control unit 110 controls the process of radio communication with mobile stations 200 and 200a. To this end, the control unit 110 includes a bandwidth setting unit 111, a transmission mode setting unit 112, a grouping unit 113, and a CI assignment unit 114.

The bandwidth setting unit 111 selects bandwidths of CC#1 to CC#5 from among the following values: 6 RB (1.4 MHz), 15 RB (3 MHz), 25 RB (5 MHz), 50 RB (10 MHz), 75 RB (15 MHz), and 100 RB (20 MHz). For example, the bandwidth setting unit 111 may change the selection of bandwidth in accordance with an operator command. The bandwidth setting unit 111 informs the PBCH signal generation unit 120 and PDCCH signal generation unit 140 of the selected bandwidths.

The transmission mode setting unit 112 selects transmission mode of each CC that the mobile stations 200 and 200a use. The selection of transmission mode may differ from mobile station to mobile station. Specifically, the transmission mode setting unit 112 selects one of the transmission modes 1 to 8, considering the functions supported by the mobile stations 200 and 200a, as well as the current condition of propagation paths. The transmission mode setting unit 112 informs the PDCCH signal generation unit 140 and PDSCH signal generation unit 150 of the selected transmission mode.

As mentioned above, the base station 100 sorts CCs into groups. The grouping unit 113 performs this grouping on the basis of bandwidth and transmission mode that the bandwidth setting unit 111 and transmission mode setting unit 112 have selected. When a specific group of CCs is formed, control signals pertaining to communication performed with those CCs can be transmitted together in a single search space of a single CC. Control signals pertaining to different groups of CCs may be transmitted with a single CC or with two or more CCs. The grouping unit 113 determines such groups of CCs individually for each mobile station. Details of the grouping method will be described later.

The grouping unit 113 also selects at least one monitoring CC for sending control signals pertaining to each group of CCs. The grouping unit 113 informs the PDCCH signal generation unit 140 and PDSCH signal generation unit 150 of this monitoring CC and its associated group of CCs for data communication. The grouping unit 113 further assigns an identifier (group ID) to each group of CCs and informs the PDSCH signal generation unit 150 of those group IDs.

The CI assignment unit 114 assigns a CI to each CC that the mobile stations 200 and 200a use. CIs are used to distinguish CC#1 to CC#5 from each other in notifications sent from the base station 100 to mobile stations 200 and 200a, as well as in control signals of PDCCH. CIs may be unique across the entire set of CCs #1 to #5 or within each particular group of CCs. It is preferable that CCs are uniquely identified by their CIs at least when the control signals for these CCs are transmitted with a single CC. The CI assignment unit 114 informs the PDSCH signal generation unit 150 of the CIs assigned in this way.

The PBCH signal generation unit 120 generates broadcast information signals of PBCH, based on the information provided from the control unit 110. As mentioned previously, this broadcast information may include parameters indicating the bandwidths of downlink CCs. Broadcast information is produced individually for each CC. The PBCH signal generation unit 120 outputs the produced broadcast information signals to the radio transmitter 160.

The scheduler 130 manages the allocation of radio resources. More specifically, the scheduler 130 allocates PDSCH radio resources to a mobile station 200 or 200a when user data addressed thereto arrives at the base station 100 from its upper-level network. The scheduler 130 also allocates PUSCH radio resources to mobile stations 200 and 200a when there is user data or control information that the base station 100 has to receive. The scheduler 130 informs the PDCCH signal generation unit 140 of such scheduling results.

The PDCCH signal generation unit 140 produces control signals to be transmitted with PDCCH according to the scheduling result informed of from the scheduler 130. As discussed previously, the produced control signals actually include those concerning PDSCH and those concerning PUSCH. In the course of generating control signals, the PDCCH signal generation unit 140 adjusts their length on the basis of combinations of bandwidth and transmission mode indicated by the control unit 110. The PDCCH signal generation unit 140 also determines which CCs to use to transmit control signals, on the basis of information sent from the control unit 110. The PDCCH signal generation unit 140 supplies the produced control signals to the radio transmitter 160.

The PDSCH signal generation unit 150 produces data signals by applying error-correction coding to user data received from the upper-level network and notifications received from the control unit 110. As described previously, the notification data may include the following information: the central frequency and bandwidth of each uplink CC, group IDs, CIs, monitoring CCs, communication CCs, association between monitoring CCs and communication CCs, and transmission mode. The PDSCH signal generation unit 150 supplies the produced data signals to the radio transmitter 160.

The radio transmitter 160 up-converts given signals and transmits the resulting radio-frequency signals from antennas. These signals convey broadcast information supplied from the PBCH signal generation unit 120, control signals supplied from the PDCCH signal generation unit 140, and data signals supplied from the PDSCH signal generation unit 150. While not explicitly depicted in FIG. 11, the radio transmitter 160 actually includes various circuits to achieve the up-conversion, such as digital-to-analog (D/A) converter, frequency converter, and bandpass filter (BPF).

The radio receiver 170, on the other hand, down-converts radio signals received from mobile stations 200 and 200a and supplies the resulting baseband signals to a PUSCH processing unit 180. While not explicitly depicted in FIG. 11, the radio transmitter 160 actually includes various circuits to achieve the down-conversion, such as low-noise amplifier (LNA), frequency converter, BPF, and analog-to-digital (A/D) converter.

The PUSCH processing unit 180 performs error-correction decoding on the baseband signals supplied from the radio receiver 170, thereby extracting user data received from mobile stations 200 and 200a via PUSCH and control information received from the upper layer. The extracted user data is forwarded to the upper-level network, and part of the control information is passed to the scheduler 130.

The above-described PBCH signal generation unit 120, PDCCH signal generation unit 140, PDSCH signal generation unit 150, radio transmitter 160, radio receiver 170, and PUSCH processing unit 180 may be provided in plurality, one for each of CC#1 to CC#5.

Figure 12:
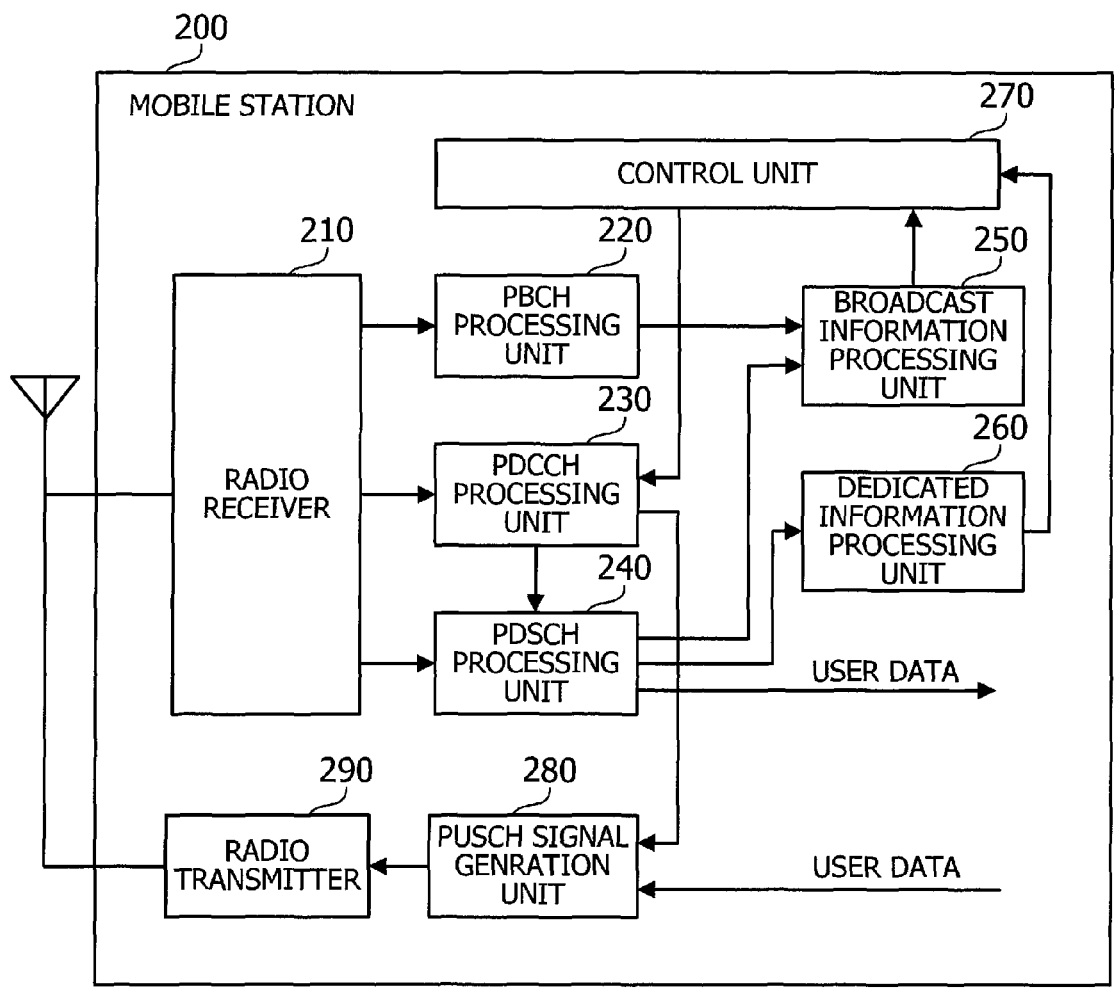
FIG. 12 is a block diagram of a mobile station.

FIG. 12 is a block diagram of a mobile station. The illustrated mobile station 200 includes a radio receiver 210, a PBCH processing unit 220, a PDCCH processing unit 230, a PDSCH processing unit 240, a broadcast information processing unit 250, a dedicated information processing unit 260, a control unit 270, a PUSCH signal generation unit 280, a radio transmitter 290. The other mobile station 200a may have the same structure as this mobile station 200.

The radio receiver 210 down-converts radio signals received from the base station 100 and supplies the resulting baseband signals to the PBCH processing unit 220, PDCCH processing unit 230 and PDSCH processing unit 240. While not explicitly depicted in FIG. 12, the radio receiver 210 actually includes various circuits for the down-conversion, such as LNA, frequency converter, BPF, and A/D converter.

The PBCH processing unit 220 extracts PBCH signals out of baseband signals supplied from the radio receiver 210 and applies error-correction decoding to the extracted signals in order to reproduce broadcast information. Specifically, signals are extracted from a particular radio resource region known as being assigned as PBCH. This PBCH signal extraction is performed on an individual CC basis. The PBCH processing unit 220 supplies the reproduced broadcast information to the broadcast information processing unit 250.

PDCCH signals are contained in the common search space and UE-specific search space for the mobile station 200, but their data structure is unknown to the receiving mobile station 200. The PDCCH processing unit 230 extracts candidates for such PDCCH signals out of baseband signals supplied from the radio receiver 210. The PDCCH processing unit 230 executes blind decoding on each extracted PDCCH candidate, thereby detecting control signals that the mobile station 200 has to use for its operation. This blind decoding is performed with reference to some information supplied from the control unit 270, which indicates monitoring CCs to be decoded and candidates for the length of control signals.

The control signals may include those concerning PDSCH and those concerning PUSCH as noted above. PDSCH-related control signals indicate radio resources allocated for PDSCH and a data format being applied. PUSCH-related control signals specify radio resources for PUSCH and a data format to apply. The PDCCH processing unit 230 supplies such PDSCH-related control signals to the PDSCH processing unit 240, and PUSCH-related control signals to the PUSCH signal generation unit 280.

With reference to the PDSCH-related control signals received from the PDCCH processing unit 230, the PDSCH processing unit 240 extracts data signals of PDSCH out of the baseband signals supplied from the radio receiver 210 and applies error correction decoding to the extracted data signals. This operation extracts user data and control information that the base station 100 has transmitted. The extracted control information of PDSCH includes broadcast information (indicating the central frequency and bandwidth of each uplink CC) and dedicated information. The PDSCH processing unit 240 passes the former information to the broadcast information processing unit 250, and the latter information to the dedicated information processing unit 260.

The broadcast information processing unit 250 thus receives broadcast information of PBCH from the PBCH processing unit 220, as well as broadcast information of PDSCH from the PDSCH processing unit 240. The broadcast information processing unit 250 notifies the control unit 270 of the bandwidths of CC#1 to CC#5 indicated in the broadcast information. The broadcast information processing unit 250 also estimates the number of antenna ports of the base station 100 from the result of signal processing that the PBCH processing unit 220 has performed on broadcast information. For example, the number of antenna ports may be estimated from a scramble sequence used in the scrambling of cyclic redundancy check (CRC) bits. The estimated number is sent to the control unit 270.

The dedicated information processing unit 260, on the other hand, receives dedicated information of PDSCH from the PDSCH processing unit 240. This dedicated information indicates monitoring CCs, CC groups, transmission mode of each CC used for data communication, and others. The dedicated information processing unit 260 sends these pieces of information to the control unit 270.

Based on the above-described information from the broadcast information processing unit 250 and dedicated information processing unit 260, the control unit 270 controls the process of blind decoding performed by the PDCCH processing unit 230. Specifically, the control unit 270 notifies the PDCCH processing unit 230 of monitoring CCs. The control unit 270 also selects candidates for the length of control signals for each monitoring CC, based on the bandwidth and transmission mode of each CC for data communication, as well as on the estimated number of antenna ports of the base station 100. The control unit 270 then informs the PDCCH processing unit 230 of those candidates for the control signal length.

With reference to control signals supplied from the PDCCH processing unit 230, the PUSCH signal generation unit 280 produces data signals for transmission to the base station 100 via PUSCH by performing an error-correction coding on outgoing user data and control data for the upper layer. The PUSCH signal generation unit 280 supplies the produced data signals to the radio transmitter 290. It is noted that the subframe carrying these data signals is transmitted a predetermined time (e.g., four subframe intervals) after the subframe carrying PUSCH-related control signals is received.

The radio transmitter 290 up-converts data signals supplied from the PUSCH signal generation unit 280 into radio-frequency signals that can be transmitted from the antenna. While not explicitly depicted in FIG. 12, the radio transmitter 290 actually includes several circuits to achieve the up-conversion, such as D/A converter, frequency converter, and BPF. The above-described radio receiver 210, PBCH processing unit 220, PDCCH processing unit 230, PDSCH processing unit 240, PUSCH signal generation unit 280, and radio transmitter 290 may be provided in plurality, one for each of CC#1 to CC#5.

Figure 13:
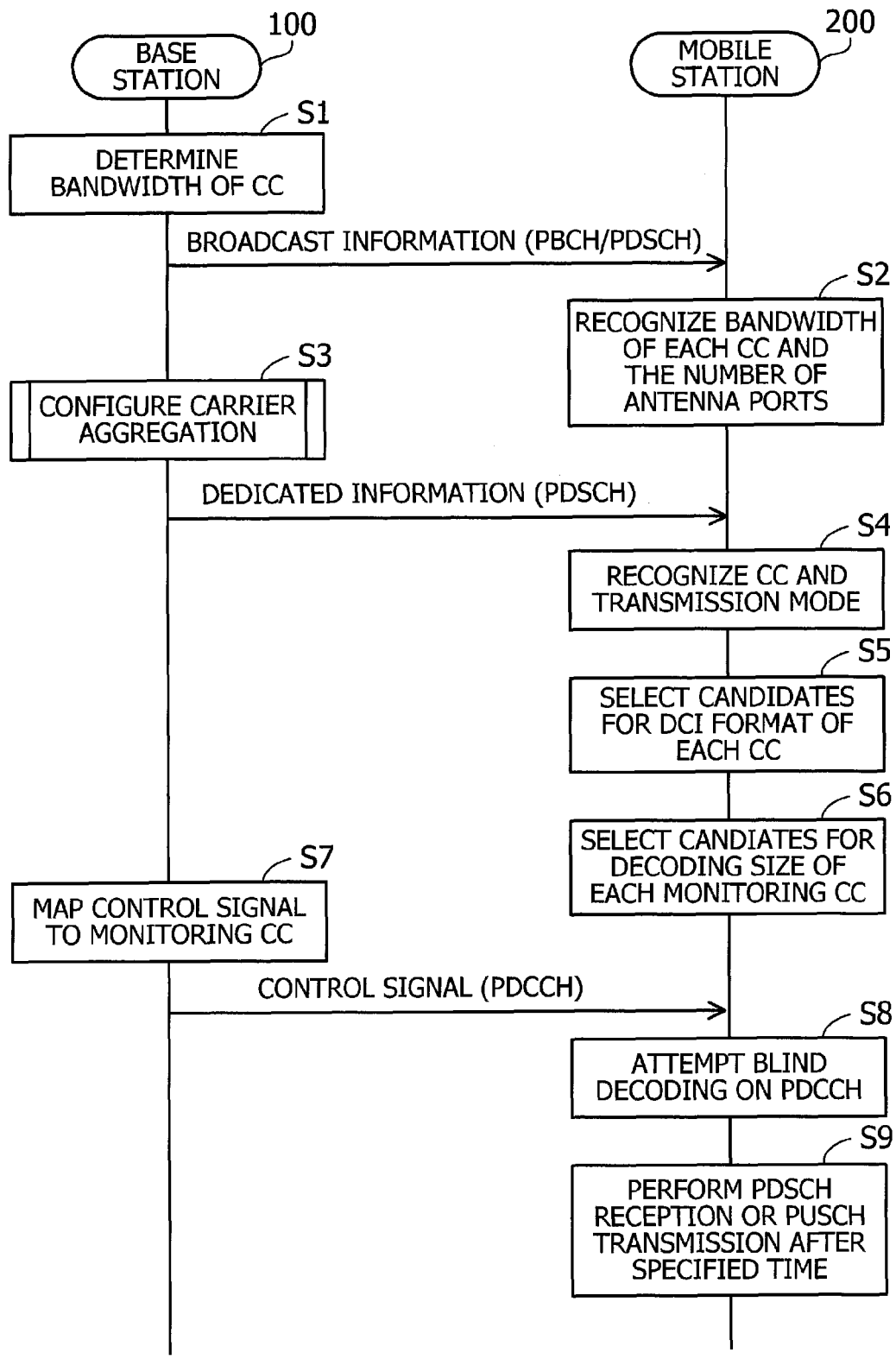
FIG. 13 is a flowchart of PDCCH transmission and reception.

FIG. 13 is a flowchart of PDCCH transmission and reception. While this flowchart assumes communication between the base station 100 and one mobile station 200, the illustrated control may similarly be applied to another mobile station 200a. Each step in FIG. 13 will now be described below in the order of step numbers.

(S1) The base station 100 determines bandwidths of CC#1 to CC#5, for both downlink and uplink. The base station 100 then transmits broadcast information via PBCH to indicate the determined bandwidths of downlink CCs. The base station 100 also transmits broadcast information via PDSCH to indicate the determined bandwidths of uplink CCs.

(S2) The mobile station 200 receives broadcast information from the base station 100 and recognizes therefrom what bandwidth each CC#1 to CC#5 has and how many antenna ports the base station 100 is using.

(S3) The base station 100 configures carrier aggregation for the mobile station 200. That is, the mobile station 200 is to use a plurality of CCs, and the base station 100 sorts these CCs into groups and assigns at least one monitoring CC to each group. The base station 100 transmits dedicated information via PDSCH to inform the mobile station 200 of the setup of carrier aggregation.

(S4) The mobile station 200 receives this dedicated information from the base station 100, thus recognizing CCs that the mobile station 200 is supposed to use for its data communication, as well as the transmission mode of each such CC.

(S5) For each CC to be used in data communication, the mobile station 200 selects candidates for DCI format used in PDCCH related to the CC, based on the transmission mode recognized at step S4. Specifically, DCI formats 1, 1B, 1D, 2, 2A, and 2B may be used in a UE-specific search space. From among these DCI formats, the mobile station 200 selects DCI formats relevant to the given transmission mode.

(S6) For each monitoring CC, the mobile station 200 selects candidates for the PDCCH signal length (i.e., blind decoding sizes), based on the bandwidth and the number of antenna ports recognized at step S2, as well as on the candidates for DCI format selected at step S5. In the case where the monitoring CC in question carries PDCCHs pertaining to a plurality of CCs, the mobile station 200 determines a common data size applicable to these CCs in order to reduce the number of blind decoding operations. The mobile station 200 then watches the common search space of each monitoring CC and a UE-specific search space of its own.

(S7) The base station 100 produces control signals for use by the mobile station 200 in processing its PDSCH or PUSCH. The produced control signals are then transmitted to the mobile station 200, being mapped to PDCCH in the common search space or UE-specific search space.

(S8) Based on the blind decoding sizes determined at step S6, the mobile station 200 performs blind decoding of PDCCH. More specifically, the mobile station 200 extracts candidates for PDCCH from the common search space in each monitoring CC and the UE-specific search space of the mobile station 200 itself. The mobile station 200 then attempts to decode each extracted PDCCH candidate, assuming a plurality of candidates for the control signal length. If the error-correction decoding yields a successful result, it means that the mobile station 200 has obtained control signals that the mobile station 200 is supposed to use in its operation.

(S9) Based on the control signals extracted at step S8, the mobile station 200 controls downlink or uplink communication with the base station 100. More specifically, the mobile station 200 may have extracted a PDSCH-related control signal. In that case, the mobile station 200 performs PDSCH reception in accordance with the extracted control signal. The mobile station 200 may also have extracted a PUSCH-related control signal. In this case, the mobile station 200 performs PUSCH transmission in a subsequent subframe scheduled after a predetermined time, in accordance with the extracted control signal.

It is noted here that the base station 100 does not need to repeat the processing of step S1 unless there is a change in the bandwidth of CC#1 to CC#5 or the number of antenna ports. Steps S3 to S6 are also not repeated as long as the mobile station 200 keeps using the same CCs and transmission mode. The processing of step S7, on the other hand, continues until the mobile station 200 is disconnected from the base station 100.

Figure 14:
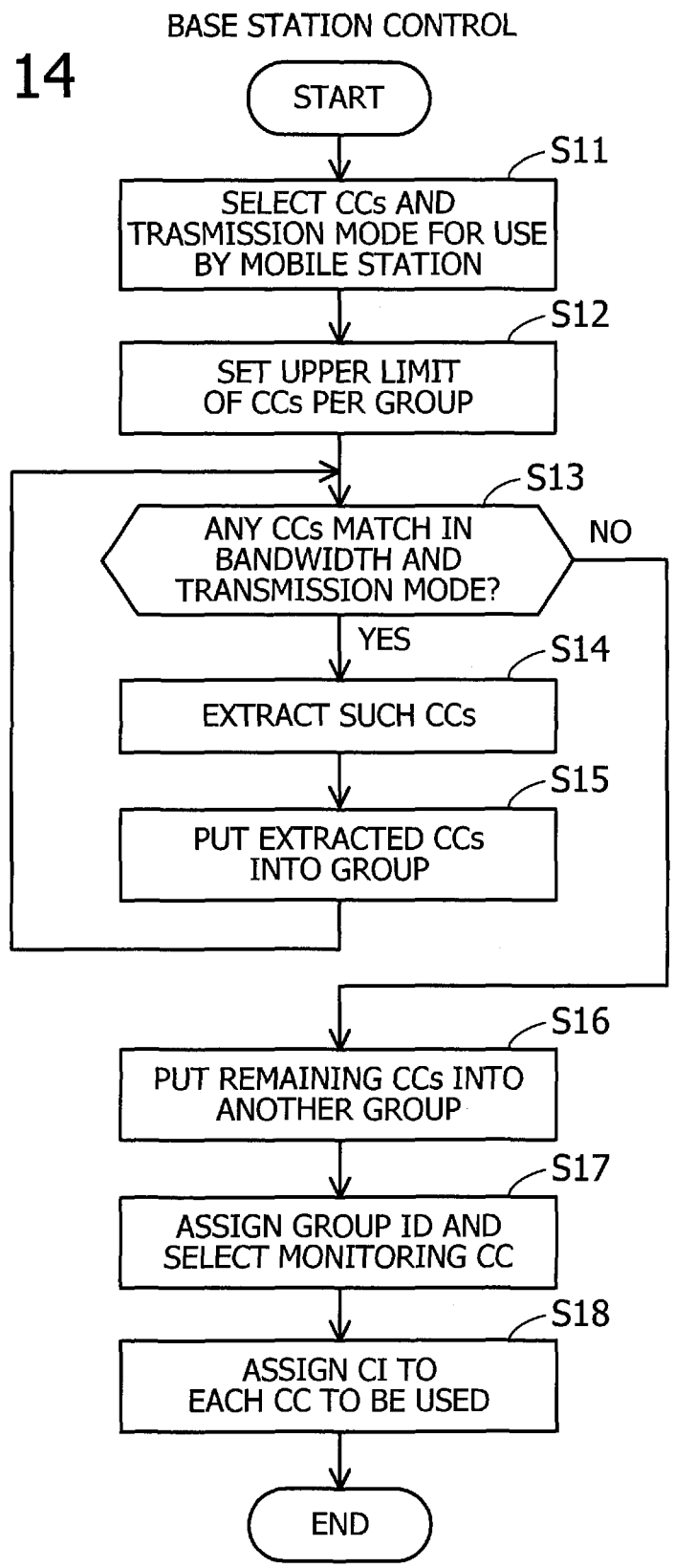
FIG. 14 is a flowchart of base station control according to the second embodiment.

FIG. 14 is a flowchart of base station control according to the second embodiment. This flowchart illustrates a specific example of what the base station 100 performs at step S3 in FIG. 13. Each step in FIG. 14 will now be described below in the order of step numbers.

(S11) The transmission mode setting unit 112 selects CCs for use by the mobile station 200. More specifically, the transmission mode setting unit 112 selects CCs that can accommodate PDSCH or PUSCH for the mobile station 200. The transmission mode setting unit 112 further determines transmission mode of each CC to be used.

(S12) The grouping unit 113 sets an upper limit to the number of CCs that can form a single group. This upper limit is determined in consideration of the amount of control signals that can be transmitted together by using one CC. Suppose, for example, that the upper limit is set to three.

(S13) When there are free CCs that do not belong to any existing groups, the grouping unit 113 determines whether they include two or more CCs that match in both the downlink bandwidth and transmission mode. If such CCs are found, the process advances to step S14. If there are no such CCs, the process proceeds to step S16.

(S14) The grouping unit 113 extracts a plurality of free CCs that match in both the downlink bandwidth and transmission mode, within the upper limit set at step S12.

(S15) The grouping unit 113 creates a group from the CCs extracted at step S14. The process then goes back to step S13.

(S16) If there still remain free CCs that do not belong to any existing groups, the grouping unit 113 puts those CCs into another new group, within the upper limit set at step S12.

(S17) The grouping unit 113 assigns a group ID to each group defined at steps S15 and S16. The grouping unit 113 also selects at least one monitoring CC for each group defined at steps S15 and S16. The monitoring CC of a group may belong to that same group, or may be selected from another group. For example, the mobile station 200 may find a particular CC to have a good communication quality. In this case, the grouping unit 113 chooses that CC as the monitoring CC.

(S18) The CI assignment unit 114 assigns a CI to each CC to be used by the mobile station 200. For example, these CIs are three bits in length and may be unique within the group to which the CCs belong.

As can be seen from the above flowchart, the second embodiment is designed to extract CCs that share the same combination of bandwidth and transmission mode, and try to put such CCs into a single group as much as possible. Such a group of similar CCs is not necessarily closed, but may admit other CCs having a different bandwidth or different transmission mode. It is also possible to create another group of CCs having different combinations of bandwidth and transmission mode. When CCs have the same combination of bandwidth and transmission mode, they share the same set of candidates for the PDCCH signal length.

As described previously, the PDCCHs of CCs in a group are transmitted together in a single search space of a single CC, rather than distributing them in different search spaces in spite of their identical signal lengths. This feature of a unified search space in a single monitoring CC avoids too much increase of blind decoding attempts.

While the flowchart of FIG. 14 assumes that every CC is supposed to belong to some group, it is also possible to modify the process such that step S16 does not create a group of remaining CCs (i.e., CCs not extracted at step S14). When this is the case, those remaining CCs are not subjected to cross-carrier scheduling. In other words, PDSCH and its related control signals are transmitted together by using a single CC. Similarly, PUSCH and its related control signals are transmitted together by using a single CC.

FIG. 15 illustrates an example of grouping of component carriers. This example assumes that one mobile station 200 receives data from its associated base station 100 by using four CCs (CC#1 to CC#4). It is also assumed that download CC#1 and CC#2 have a bandwidth of A while download CC#3 and CC#4 have a bandwidth of B, both in units of RB. Further, CC#1 and CC#2 are both configured in transmission mode X, while CC#3 and CC#4 are both configured in transmission mode Y.

In the above-noted context, the base station 100 puts CC#1 and CC#2 into one group #1, and CC#3 and CC#4 into another group #2. CC#1 is assigned as the monitoring CC of group #1. That is, control signals for PDSCH in CC#1 and CC#2 are transmitted with CC#1. For group #2, on the other hand, CC#3 is assigned as its monitoring CC. This means that control signals for PDSCH in CC#3 and CC#4 are transmitted with CC#3.

Referring to the example of FIG. 15, CIs have been assigned to four CCs to uniquely identify them within their respective groups. More specifically, CC#1 and CC#2 are identified by their respective CIs, "000" and "001" (binary). CC#3 and CC#4 are also given the same CIs "000" and "001." Alternatively, four different CIs (e.g., "000," "001", "010," "011") may be assigned to CC#1. CC#2, CC#3. and CC#4.

Figure 16:
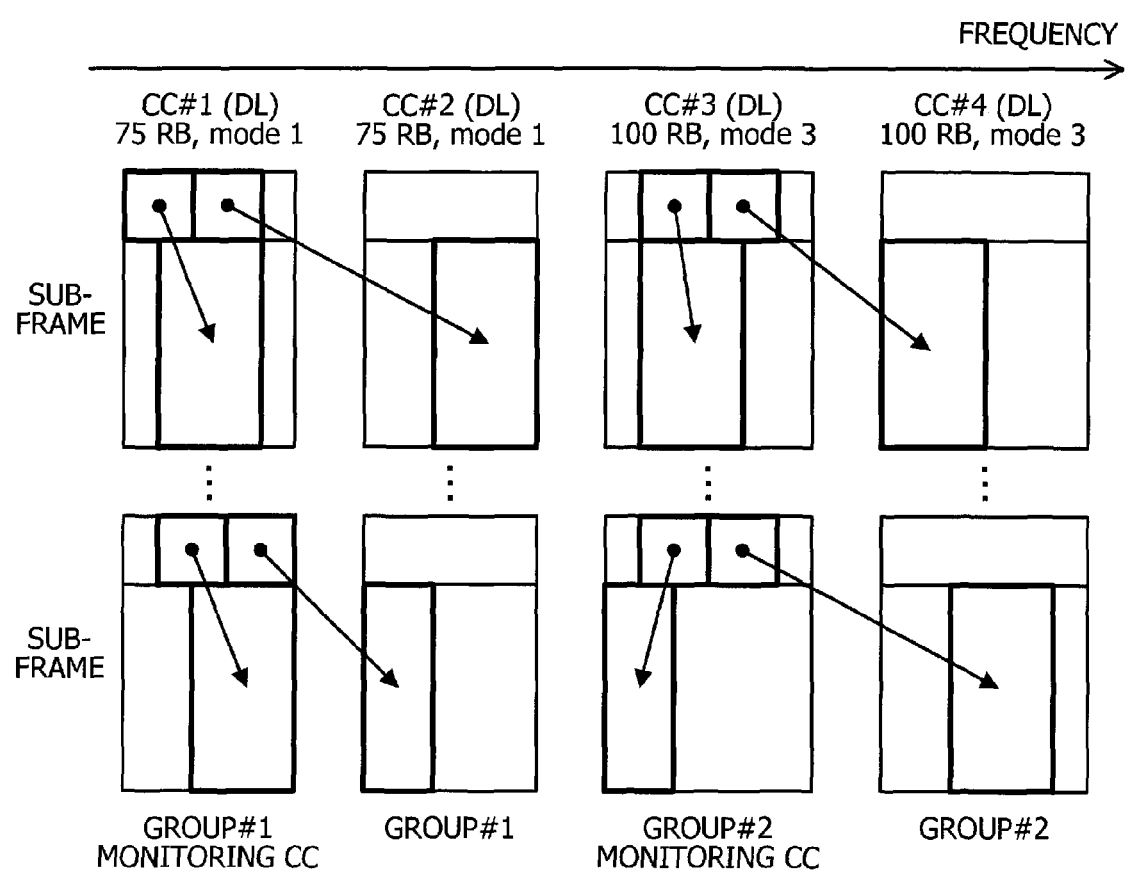
FIG. 16 illustrates a first example of PDCCH transmission according to the second embodiment.

FIG. 16 illustrates a first example of PDCCH transmission according to the second embodiment. In this example of FIG. 16, CC#1 to CC#4 are configured with the following combinations of downlink bandwidth and transmission mode: CC#1 (75 RB, transmission mode 1), CC#2 (75 RB, transmission mode 1), CC#3 (100 RB, transmission mode 3), and CC#4 (100 RB, transmission mode 3). CC#1 and CC#2 belong to group #1, and CC#3 and CC#4 belong to group #2. CC#1 serves as the monitoring CC of group #1, and CC#3 serves as the monitoring CC of group #2.

With the illustrated setup, the mobile station 200 extracts candidates for PDCCH in the common search space and UE-specific search space of CC#1 and attempts blind decoding with those candidates. The data size for blind decoding in this case is determined from the combination of 75-RB bandwidth and transmission mode 1. Because CC#1 and CC#2 share the same combination of bandwidth and transmission mode, the mobile station 200 can take advantage of common sizes for CC#1 and CC#2 when blind-decoding their PDCCH bits.

More specifically, the blind decoding for CC#1 is performed as follows. First, in the common search space, DCI formats 0, 1A, 3, and 3A have a common signal length, whereas DCI format 1C has its own different signal length (30 bits in the present case). These two are candidates for the signal length. The common search space contains six PDCCH candidates. Second, in the UE-specific search space, DCI formats 0 and 1A have a common signal length, whereas DCI format 1 supported in transmission mode 1 has its own different signal length (52 bits in the present case). These two are also among the candidates for the signal length. The UE-specific search space contains sixteen PDCCH candidates. Accordingly, the mobile station 200 may perform up to 44 attempts (=2×6+2×16) of blind decoding.

Similar to the above, the mobile station 200 extracts candidates for PDCCH in the common search space and UE-specific search space of CC#3 and attempts blind decoding with those candidates. The data size for blind decoding in this case is determined from the combination of 100-RB bandwidth and transmission mode 3. Because CC#3 and CC#4 share the same combination of bandwidth and transmission mode, the mobile station 200 can take advantage of common sizes for CC#3 and CC#4 when blind-decoding their PDCCH bits.

More specifically, the blind decoding for CC#3 is performed as follows. First, in the common search space, DCI formats 0, 1A, 3, and 3A have a common signal length, whereas DCI format 1C has its own different signal length (31 bits in the present case). These two are candidates for the signal length. Second, in the UE-specific search space, DCI formats 0 and 1A have a common signal length, whereas DCI format 2A supported in transmission mode 3 has its own different signal length (67 or 69 bits in the present case). These two are also among the candidates for the signal length.

Accordingly, the mobile station 200 may perform up to 44 attempts (=2×6+2×16) of blind decoding, just as in the case of CC#1.

As can be seen from the above discussion, the maximum number of blind-decoding operations per monitoring CC is 44 in the example of FIG. 16. Without the grouping of CC#1 to CC#4, different types of PDCCHs for CC#1 to CC#4 could be placed in one search space. In the case of the above example, each monitoring CC would be subjected to blind decoding, not only with the possible sizes determined from the combination of 75-RB bandwidth and transmission mode 1, but also with other possible sizes determined from the combination of 100-RB bandwidth and transmission mode 3. Accordingly, the mobile station 200 would have to perform up to 88 (=44×2) blind decoding operations per monitoring CC 1. As can be seen from this calculation, the second embodiment reduces the repetitions of blind decoding by grouping CC#1 to CC#4 as illustrated in FIG. 16.

Figure 17:
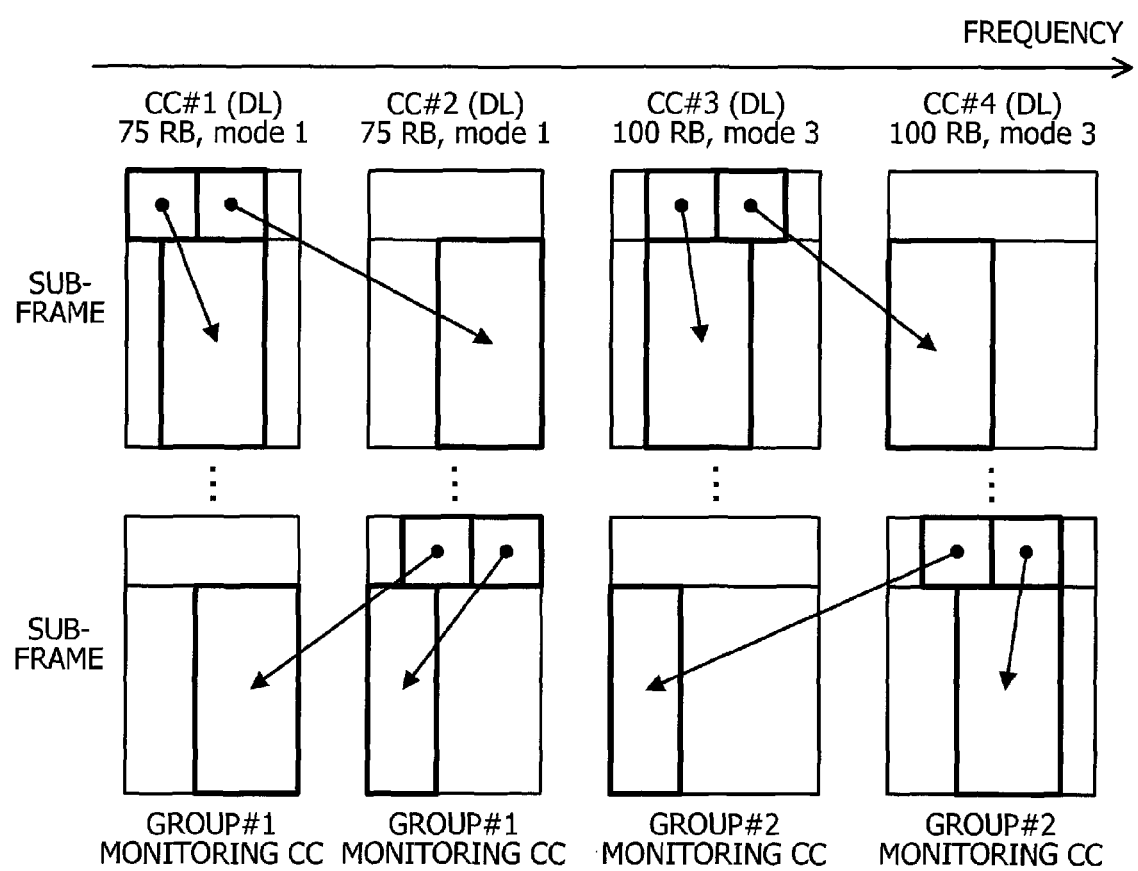
FIG. 17 illustrates a second example of PDCCH transmission according to the second embodiment.

FIG. 17 illustrates a second example of PDCCH transmission according to the second embodiment. In the example of FIG. 17, CC#1 to CC#4 are configured with the same combinations of downlink bandwidth and transmission mode as those discussed in FIG. 16. The difference is that CC#1 and CC#2 are both assigned as monitoring CCs in group #1, as are CC#3 and CC#4 in group #2.

As the second example demonstrates, it is possible for a group of CCs to have a plurality of monitoring CCs. This setup of monitoring CCs works effectively when, for example, the PDCCH has to convey a large number of control signals, or when the communication quality of CC#1 to CC#4 is not stable. The mobile station 200 may perform up to 44 attempts of blind decoding for each of CC#1 to CC#4 similarly to the case discussed in FIG. 16.

Figure 18:
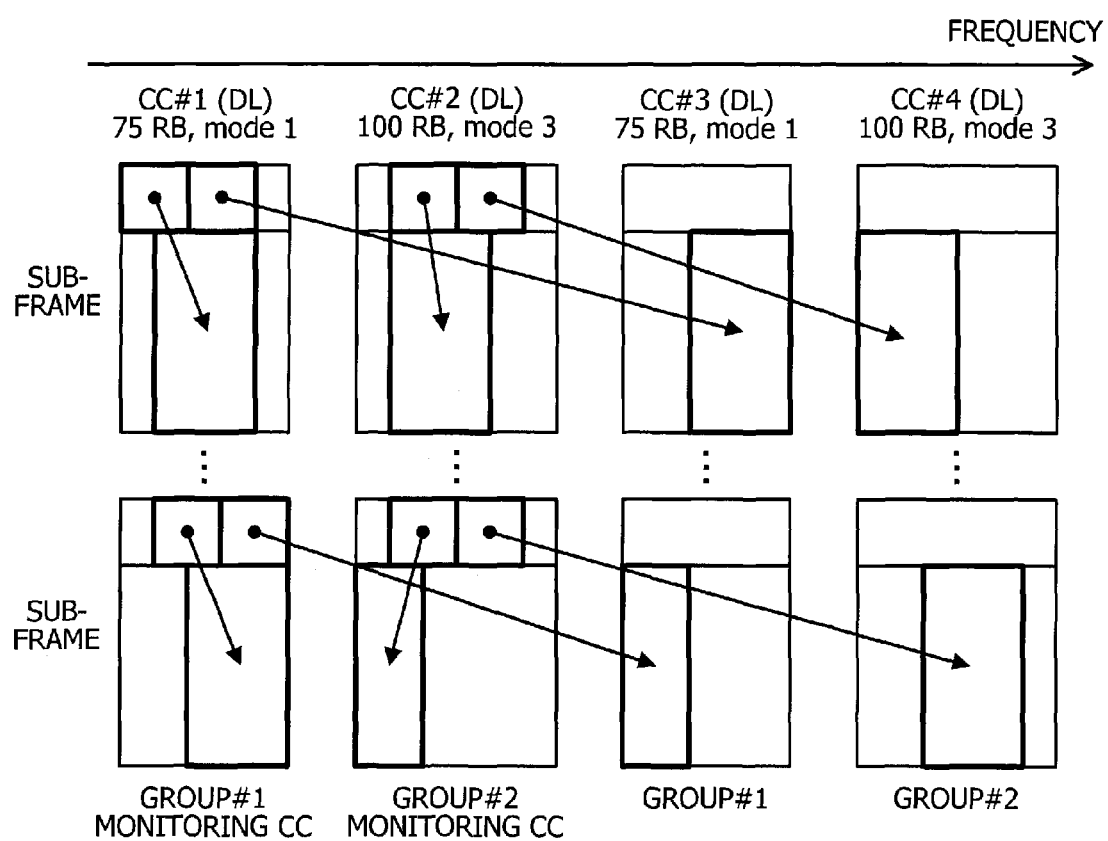
FIG. 18 illustrates a third example of PDCCH transmission according to the second embodiment.

FIG. 18 illustrates a third example of PDCCH transmission according to the second embodiment. In this example of FIG. 18, CC#1 to CC#4 are configured with the following combinations of downlink bandwidth and transmission mode: CC#1 (75 RB, transmission mode 1), CC#2 (100 RB, transmission mode 3), CC#3 (75 RB, transmission mode 1), and CC#4 (100 RB, transmission mode 3). CC#1 and CC#3 thus belong to group #1. and CC#2 and CC#4 belong to group #2. CC#1 serves as the monitoring CC of group #1. and CC#2 serves as the monitoring CC of group #2.

With the illustrated setup, the mobile station 200 extracts candidates for PDCCH in the common search space and UE-specific search space of CC#1 and attempts blind decoding with those candidates. Since CC#1 and CC#3 share a common combination of bandwidth and transmission mode, the maximum number of blind decoding operations is 44. The mobile station 200 also extracts candidates for PDCCH in the common search space and UE-specific search space of CC#2 and attempts blind decoding with those candidates. Since CC#2 and CC#4 share a common combination of bandwidth and transmission mode, the maximum number of blind decoding operations is 44, just as in the case of CC#1. The example of FIG. 18 demonstrates that a group can be formed from CCs that are not immediately adjacent.

Figure 19:
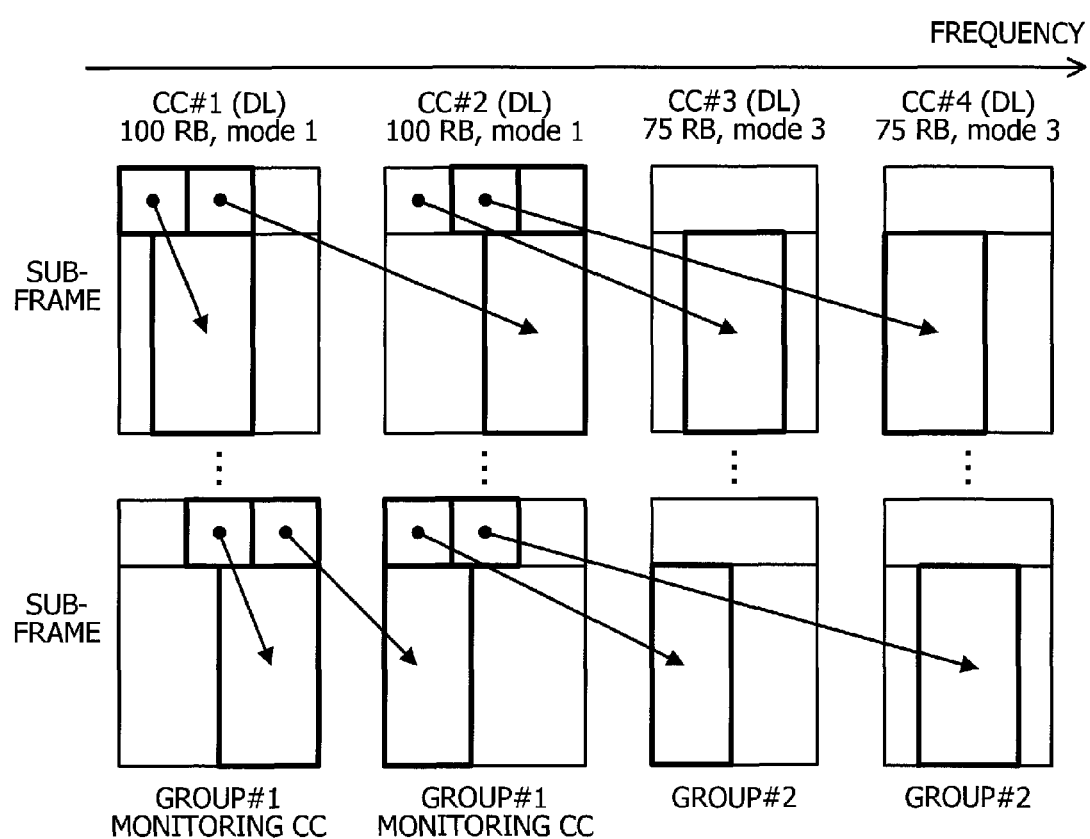
FIG. 19 illustrates a fourth example of PDCCH transmission according to the second embodiment.

FIG. 19 illustrates a fourth example of PDCCH transmission according to the second embodiment. In this example of FIG. 19, CC#1 to CC#4 are configured with the following combinations of downlink bandwidth and transmission mode: CC#1 (100 RB, transmission mode 1), CC#2 (100 RB, transmission mode 1), CC#3 (75 RB, transmission mode 3), and CC#4 (75 RB, transmission mode 3). CC#1 to CC#4 are divided into two groups in the same way as the first example discussed in FIG. 16. CC#1 similarly serves as the monitoring CC of group #1. But, in FIG. 19, it is CC#2 that serves as the monitoring CC of group #2.

The example of FIG. 19 demonstrates that monitoring CCs of a group can be selected from among CCs belonging to other groups. This selection of monitoring CCs works effectively when, for example, some CCs in other groups have a better communication quality than any CCs in the group of interest. The noted selection is also effective when some CCs in other groups have a larger PDCCH capacity than any CCs in the group CC of interest. The mobile station 200 may perform up to 44 attempts of blind decoding for each of CC#1 and CC#2 similarly to the case discussed in FIG. 16.

Figure 20:
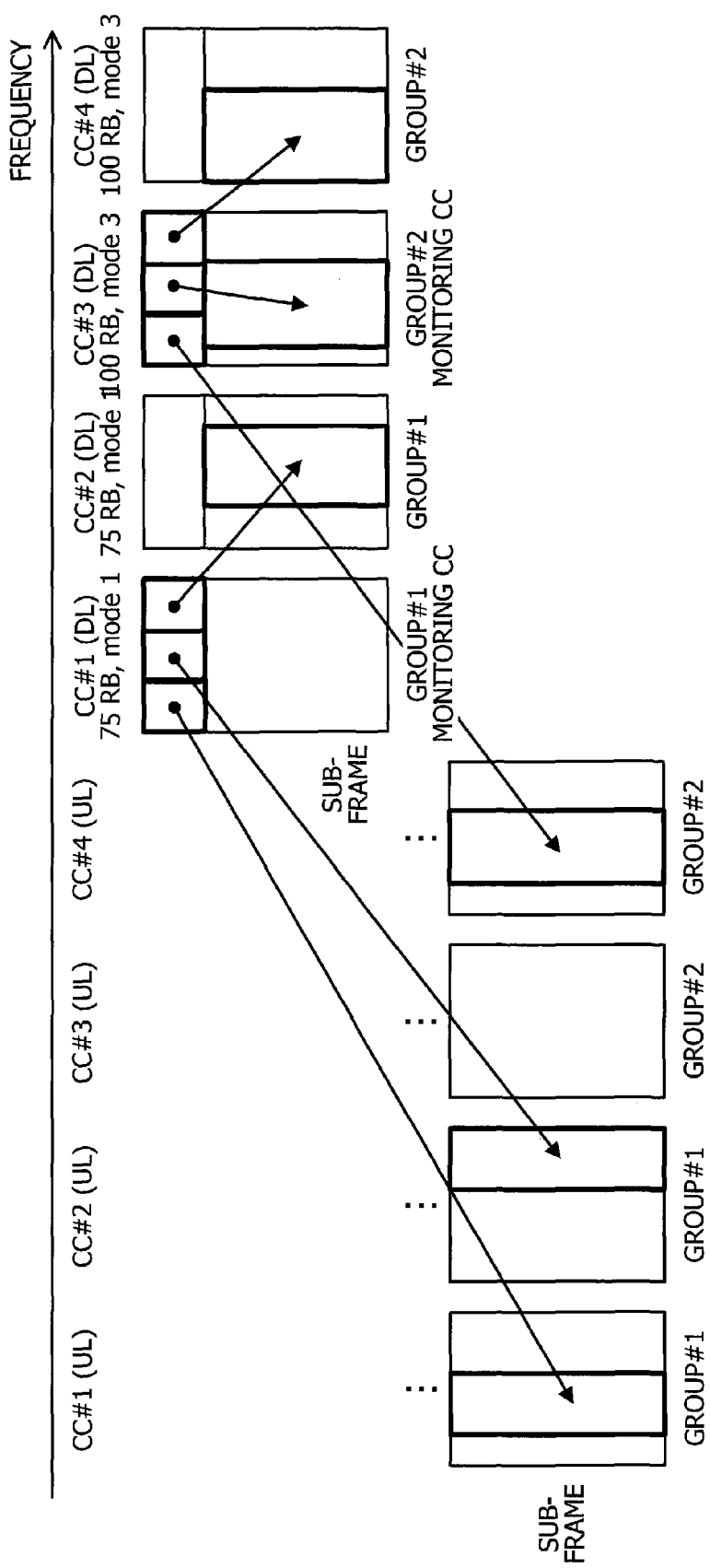
FIG. 20 illustrates a fifth example of PDCCH transmission according to the second embodiment.

FIG. 20 illustrates a fifth example of PDCCH transmission according to the second embodiment. The foregoing first to fourth examples of FIGS. 16 to 19 have illustrated how the downlink CCs #1 to #4 can be divided into groups. The second embodiment enables grouping of uplink CCs #1 to #4 as well. For example, uplink CC groups may be defined independently of downlink CC groups, based on the bandwidth of uplink CC#1 to CC#4 (or the combination of bandwidth and transmission mode in the case where uplink transmission mode is implemented). It would be another option to define uplink CC groups by applying the same grouping of downlink CCs, i.e., without distinguishing between downlink CCs and uplink CCs.

The example seen in FIG. 20 uses the last-mentioned option, so that uplink CC groups correspond to downlink CC groups. More specifically, uplink CC#1 and CC#2 belong to group #1, and uplink CC#3 and CC#4 belong to group #2, similarly to their respective counterparts in the downlink. Downlink CC#1 serves also as the monitoring CC associated with uplink CC#1 and CC#2 in group #1. Similarly, downlink CC#3 serves also as the monitoring CC associated with uplink CC#3 and CC#4 in group #2.

With the illustrated setup, the mobile station 200 extracts candidates for PDCCH in the common search space and UE-specific search space of CC#1 and attempts blind decoding with those candidates. This operation may extract control signals related to PUSCH of CC#1 and CC#2. The mobile station 200 also extracts candidates for PDCCH in the common search space and UE-specific search space of CC#3 and attempts blind decoding with those candidates. This operation may extract control signals related to PUSCH of CC#3 and CC#4.

In the example of FIG. 20, the common search space and UE-specific search space of CC#1 also contain control signals related to PDSCH of CC#1 and CC#2. Similarly, the common search space and UE-specific search space of CC#3 also contain control signals related to PDSCH of CC#3 and CC#4. Alternatively, the PUSCH-related control signal and PDSCH-related control signal may be transmitted by using different monitoring CCs.

In the above-described mobile communications system, the mobile stations 200 and 200a use a plurality of CCs in their data communication, under the cross-carrier scheduling by the base station 100. The second embodiment mitigates the increase in the number of PDCCH signal length candidates per monitoring CC even in such situations. Accordingly, the mobile stations 200 and 200a have only to execute a limited number of blind decoding attempts. The second embodiment thus alleviates the burden on the mobile stations 200 and 200a.

(c) Third Embodiment

This section describes a third embodiment, with a focus on its difference from the second embodiment. See the preceding section for their common features. Briefly, the third embodiment enables a mobile communications system to create a group of CCs under more relaxed conditions than in the second embodiment.

The third embodiment can be implemented in a mobile communications system with the same structure discussed in FIG. 2 for the second embodiment. The block structures of a base station and a mobile station respectively illustrated in FIGS. 11 and 12 for the second embodiment can similarly be applied to those in the third embodiment. The exception is that the grouping unit 113 operates differently from the second embodiment. The following description of the third embodiment will use the same reference numerals seen in FIGS. 11 and 12.

Figure 21:
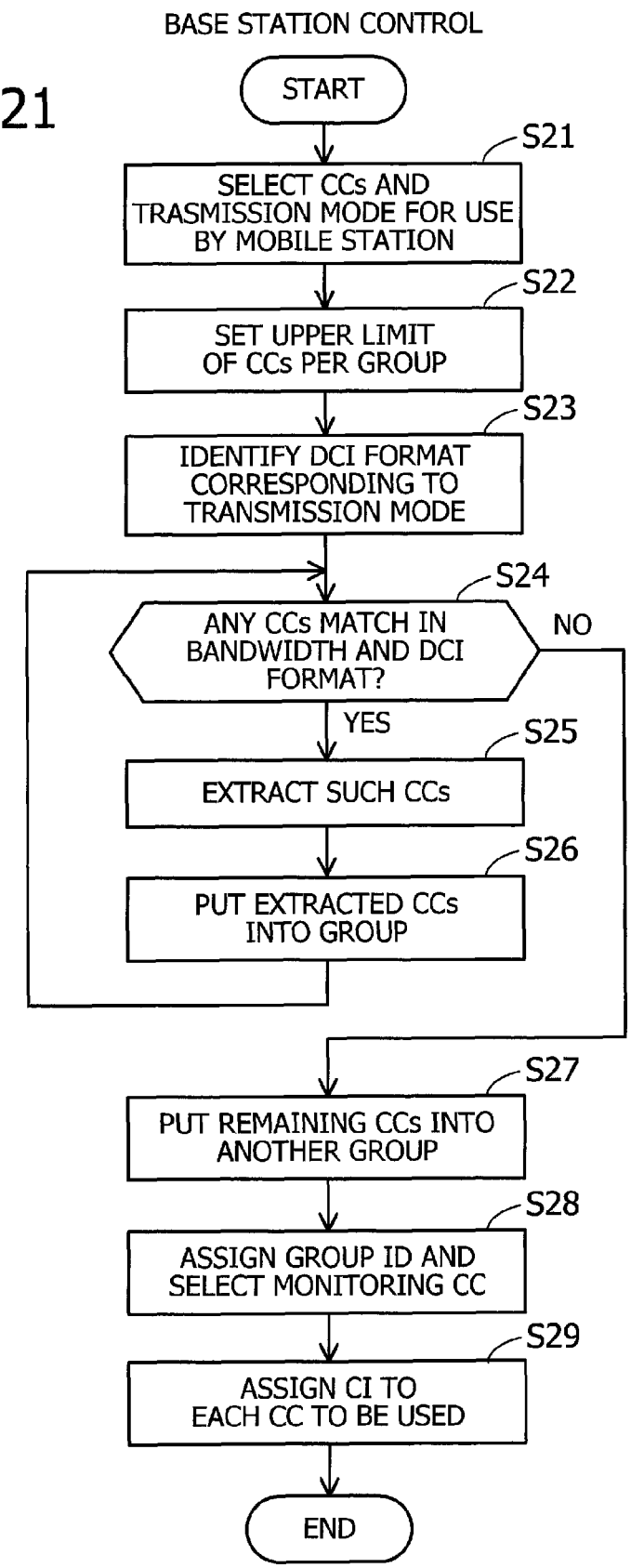
FIG. 21 is a flowchart of base station control according to a third embodiment.

FIG. 21 is a flowchart of base station control according to the third embodiment. This flowchart illustrates a specific example of what the base station 100 performs at step S3 in FIG. 13. Each step in FIG. 21 will now be described below in the order of step numbers.

(S21) The transmission mode setting unit 112 selects CCs for use in data communication with the mobile station 200. The transmission mode setting unit 112 further determines transmission mode of each CC to be used.

(S22) The grouping unit 113 sets an upper limit to the number of CCs that can form a single group.

(S23) The grouping unit 113 identifies the DCI format corresponding to the transmission mode selected for each CC at step S21. As discussed previously in FIG. 8, the use of DCI formats 1, 1B, 1D, 2, 2A, and 2B depends on the transmission mode of CC when they are used in a UE-specific search space.

(S24) When there are free CCs that do not belong to any existing groups, the grouping unit 113 determines whether they include two or more CCs that match in both the downlink bandwidth and transmission mode. If such CCs are found, the process advances to step S25. If there are no such CCs, the process proceeds to step S27.

(S25) The grouping unit 113 extracts a plurality of free CCs that match in both the downlink bandwidth and DCI format, within the upper limit set at step S22.

(S26) The grouping unit 113 creates a group from the CCs extracted at step S25. The process then goes back to step S24.

(S27) If there still remain free CCs that do not belong to any existing groups, the grouping unit 113 puts those CCs into another new group, within the upper limit set at step S22.

(S28) The grouping unit 113 assigns a group ID to each group defined at steps S26 and S27. The grouping unit 113 also selects at least one monitoring CC for each group.

(S29) The CI assignment unit 114 assigns a CI to each CC to be used.

As can be seen from the above, the third embodiment is designed to extract CCs that share the same combination of bandwidth and DCI format, and try to put such CCs into a single group as much as possible. As seen from FIG. 8, when a CC is configured with transmission mode 1, 2, or 7, DCI format 1 is used in its UE-specific search space, no matter which of the three transmission modes is actually set. This means that the third embodiment sometimes allows CCs in different transmission modes to be grouped together in preference to others.

When CCs have the same combination of bandwidth and DCI format, they will also share the same set of candidates for the signal length of PDCCHs, which may be included in a search space of monitoring CCs. Accordingly, the third embodiment prevents the number of candidates for the PDCCH signal length from increasing too much, similarly to the foregoing second embodiment.

Figure 22:
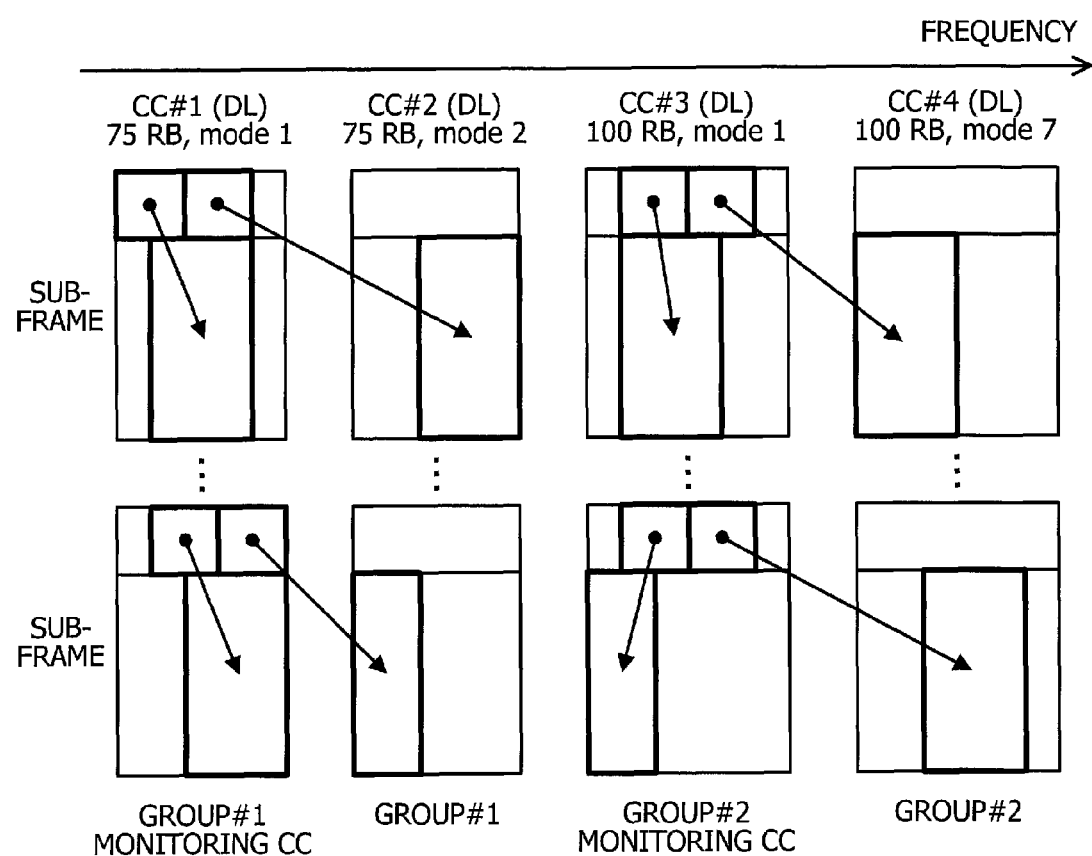
FIG. 22 illustrates an example of PDCCH transmission according to the third embodiment.

FIG. 22 illustrates an example of PDCCH transmission according to the third embodiment. In this example of FIG.

22, CC#1 to CC#4 are configured with the following combinations of downlink bandwidth and transmission mode: CC#1 (75 RB, transmission mode 1), CC#2 (75 RB, transmission mode 2), CC#3 (100 RB, transmission mode 1), and CC#4 (100 RB, transmission mode 7). CC#1 and CC#2 belong to group #1. and CC#3 and CC#4 belong to group #2. CC#1 serves as the monitoring CC of group #1, and CC#3 serves as the monitoring CC of group #2.

The mobile station 200 performs blind decoding on PDCCH bits of CC#1. The data sizes assumed in this blind decoding are determined from the bandwidth value of 75 RB and the DCI format supported in transmission modes 1 and 2. Because CC#1 and CC#2 share the same combination of bandwidth and DCI format, the mobile station 200 can take advantage of common sizes for CC#1 and CC#2 when blind-decoding their PDCCH bits.

More specifically, the blind decoding for CC#1 is performed as follows. First, in the common search space, DCI formats 0, 1A, 3, and 3A have a common signal length, whereas DCI format 1C has its own different signal length (30 bits in the present case). These two are candidates for the signal length. Second, in the UE-specific search space, DCI formats 0 and 1A have a common signal length, whereas DCI format 1 supported in transmission modes 1 and 2 has its own different signal length (52 bits in the present case). These two are also among the candidates for the signal length. Accordingly, the mobile station 200 may perform up to 44 attempts (=2×6+2×16) of blind decoding.

The mobile station 200 also performs blind decoding on PDCCH bits of CC#3 in a similar way to the above. The data sizes assumed in this blind decoding are determined from the bandwidth value of 100 RB and the DCI format supported in transmission modes 1 and 7. Because CC#3 and CC#4 share the same combination of bandwidth and DCI format, the mobile station 200 can take advantage of common sizes for CC#3 and CC#4 when blind-decoding their PDCCH bits.

More specifically, the blind decoding for CC#3 is performed as follows. First, in the common search space, DCI formats 0, 1A, 3, and 3A have a common signal length, whereas DCI format 1C has its own different signal length (31 bits in the present case). These two are candidates for the signal length. Second, in the UE-specific search space, DCI formats 0 and 1A have a common signal length, whereas DCI format 1 supported in transmission modes 1 and 2 has its own different signal length (58 bits in the present case). These two are also among the candidates for the signal length. Accordingly, the mobile station 200 may perform up to 44 attempts (=2×6+2×16) of blind decoding, just as in the case of CC#1.

The proposed mobile communications system of the third embodiment offers advantages similar to those of the second embodiment. In addition to that, the third embodiment identifies a set of CCs that may differ in the transmission mode, but are equal in terms of candidates for the PDCCH signal length, thus raising the chances of reducing repetition of blind decoding. It would also be possible to combine the grouping methods proposed in the second and third embodiments. For example, the system may be configured to apply the method of the third embodiment when it is unable to extract a plurality of CCs that have the same transmission mode.

(d) Fourth Embodiment

This section describes a fourth embodiment, with a focus on its difference from the second embodiment. See the preceding section for their common features. Briefly, the fourth embodiment enables a mobile communications system to create a group of CCs under more relaxed conditions than in the third embodiment.

The fourth embodiment can be implemented in a mobile communications system with the same structure discussed in FIG. 2 for the second embodiment. The block structures of a base station and a mobile station respectively illustrated in FIGS. 11 and 12 for the second embodiment can similarly be applied to those in the fourth embodiment. The exception is that the grouping unit 113 operates differently from the second embodiment. The following description of the fourth embodiment will use the same reference numerals seen in FIGS. 11 and 12.

Figure 23:
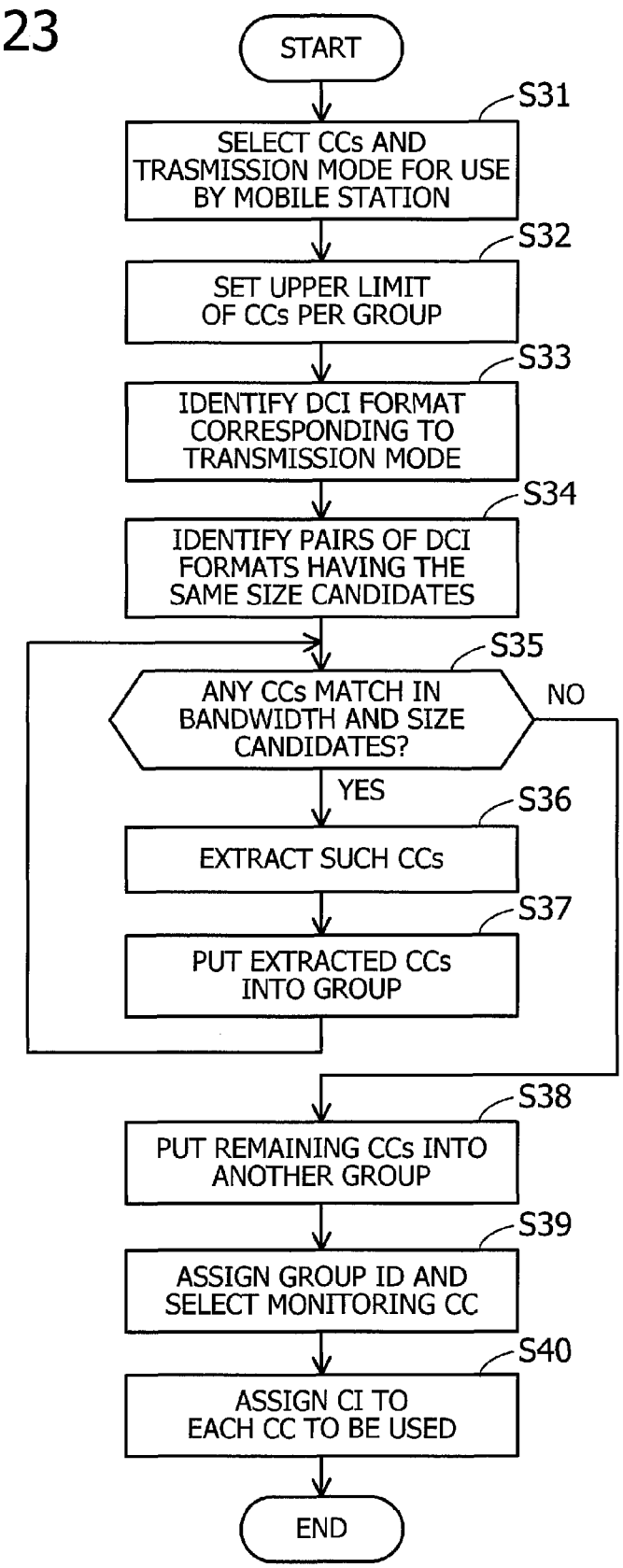
FIG. 23 is a flowchart of base station control according to a fourth embodiment.

FIG. 23 is a flowchart of base station control according to the fourth embodiment. This flowchart illustrates a specific example of what the base station 100 performs at step S3 in FIG. 13. Each step in FIG. 23 will now be described below in the order of step numbers.

(S31) The transmission mode setting unit 112 selects CCs for use in data communication with the mobile station 200. The transmission mode setting unit 112 further determines transmission mode of each CC to be used.

(S32) The grouping unit 113 sets an upper limit to the number of CCs that can form a single group.

(S33) The grouping unit 113 identifies the DCI format corresponding to the transmission mode selected for each CC at step S31.

(S34) The grouping unit 113 identifies pairs of DCI formats that have the same combinations of bandwidth and bit length. Such combinations of bandwidth and bit length are referred to herein as "size candidates." Referring to FIG. 9, DCI formats 1B and 1D have the same size candidates. DCI formats 2A and 2B also share the same size candidates in the case of two antenna ports.

(S35) When there are free CCs that do not belong to any existing groups, the grouping unit 113 determines whether they include two or more CCs that match in both the downlink bandwidth and size candidates of DCI format. If such CCs are found, the process advances to step S36. If there are no such CCs, the process proceeds to step S38.

(S36) The grouping unit 113 extracts a plurality of free CCs that match in both the downlink bandwidth and size candidates, within the upper limit set at step S32.

(S37) The grouping unit 113 creates a group from the CCs extracted at step S36. The process then goes back to step S35.

(S38) If there still remain free CCs that do not belong to any existing groups, the grouping unit 113 puts those CCs into another new group, within the upper limit set at step S32.

(S39) The grouping unit 113 assigns a group ID to each group defined at steps S37 and S38. The grouping unit 113 also selects at least one monitoring CC for each group.

(S40) The CI assignment unit 114 assigns a CI to each CC to be used.

As can be seen from the above, the fourth embodiment is designed to extract CCs that share the same combination of bandwidth and size candidates of DCI format, and try to put such CCs into a single group as much as possible.

Referring back to FIG. 8, DCI format 1B is used for UE-specific search spaces in the case of transmission mode 6, whereas DCI format 1D is used for the same in the case of transmission mode 5. This means that CCs in transmission mode 5 and those in transmission mode 6 may be grouped together in preference to others. FIG. 8 also indicates that DCI format 2A is used in transmission mode 3, whereas DCI format 2B is used in transmission mode 8. Accordingly, CCs in transmission mode 3 and those in transmission mode 8 may be grouped together in preference to others, when the base station 100 is transmitting signals with two antenna ports.

Figure 24:
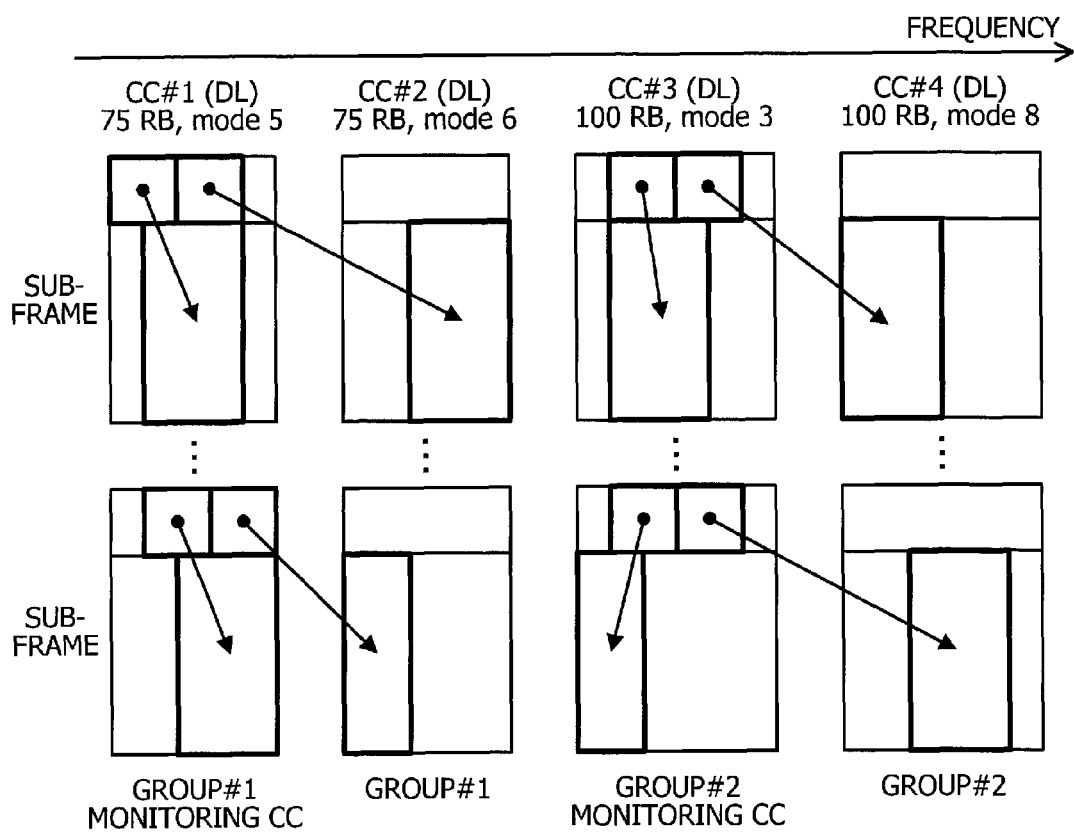
FIG. 24 illustrates an example of PDCCH transmission according to the fourth embodiment.

FIG. 24 illustrates an example of PDCCH transmission according to the fourth embodiment. In this example of FIG.

24, CC#1 to CC#4 are configured with the following combinations of downlink bandwidth and transmission mode: CC#1 (75 RB, transmission mode 5), CC#2 (75 RB, transmission mode 6), CC#3 (100 RB, transmission mode 3), and CC#4 (100 RB, transmission mode 8). CC#1 and CC#2 belong to group #1. and CC#3 and CC#4 belong to group #2. CC#1 serves as the monitoring CC of group #1, and CC#3 serves as the monitoring CC of group #2. It is assumed here that the base station 100 has two antenna ports.

The mobile station 200 performs blind decoding on PDCCH bits of CC#1. The data sizes assumed in this blind decoding are determined from the bandwidth value of 75 RB and the DCI formats supported in transmission modes 5 and 6. Because CC#1 and CC#2 share the same combination of bandwidth and size candidates of DCI format, the mobile station 200 can take advantage of common sizes for CC#1 and CC#2 when blind-decoding their PDCCH bits.

More specifically, the blind decoding for CC#1 is performed as follows. First, in the common search space, DCI formats 0, 1A, 3, and 3A have a common signal length, whereas DCI format 1C has its own different signal length (30 bits in the present case). These two are candidates for the signal length. Second, in the UE-specific search space, DCI formats 0 and 1A have a common signal length, whereas DCI formats 1B and 1D have a different common signal length (49 bits in the present case). These two are also among the candidates for the signal length. Accordingly, the mobile station 200 may perform up to 44 attempts (=2×6+2×16) of blind decoding.

The mobile station 200 also performs blind decoding on PDCCH bits of CC#3 in a similar way to the above. The data sizes assumed in this blind decoding are determined from the bandwidth value of 100 RB and the DCI format supported in transmission modes 3 and 8. Because CC#3 and CC#4 share the same combination of bandwidth and size candidates of DCI format, the mobile station 200 can take advantage of common sizes for CC#3 and CC#4 when blind-decoding their PDCCH bits.

More specifically, the blind decoding for CC#3 is performed as follows. First, in the common search space, DCI formats 0, 1A, 3, and 3A have a common signal length, whereas DCI format 1C has its own different signal length (31 bits in the present case). These two are candidates for the signal length. Second, in the UE-specific search space, DCI formats 0 and 1A have a common signal length, whereas DCI formats 2A and 2b have their own common signal length (67 bits in the present case). These two are also among the candidates for the signal length. Accordingly, the mobile station 200 may perform up to 44 attempts (=2×6+2×16) of blind decoding, just as in the case of CC#1.

The proposed mobile communications system of the fourth embodiment offers advantages similar to those of the second embodiment. In addition to that, the fourth embodiment combines a set of CCs that may differ in the transmission mode and the DCI format supported therein, but are equal in terms of candidates for the PDCCH signal length, thus raising the chances of reducing repetition of blind decoding. It would also be possible to combine the grouping methods proposed in the second to fourth embodiments. For example, the system may be configured to apply the method of the fourth embodiment when it is unable to extract a plurality of CCs that have the same transmission mode or DCI format.

(e) Fifth Embodiment

This section describes a fifth embodiment, with a focus on its difference from the second embodiment. See the preceding section for their common features. Briefly, the fifth embodiment enables a mobile communications system to create a group of CCs under more relaxed conditions than in the fourth embodiment.

The fifth embodiment can be implemented in a mobile communications system with the same structure discussed in FIG. 2 for the second embodiment. The block structures of a base station and a mobile station respectively illustrated in FIGS. 11 and 12 for the second embodiment can similarly be applied to those in the fifth embodiment. The exception is that the grouping unit 113 operates differently from the second embodiment. The following description of the fifth embodiment will use the same reference numerals seen in FIGS. 11 and 12.

Figure 25:
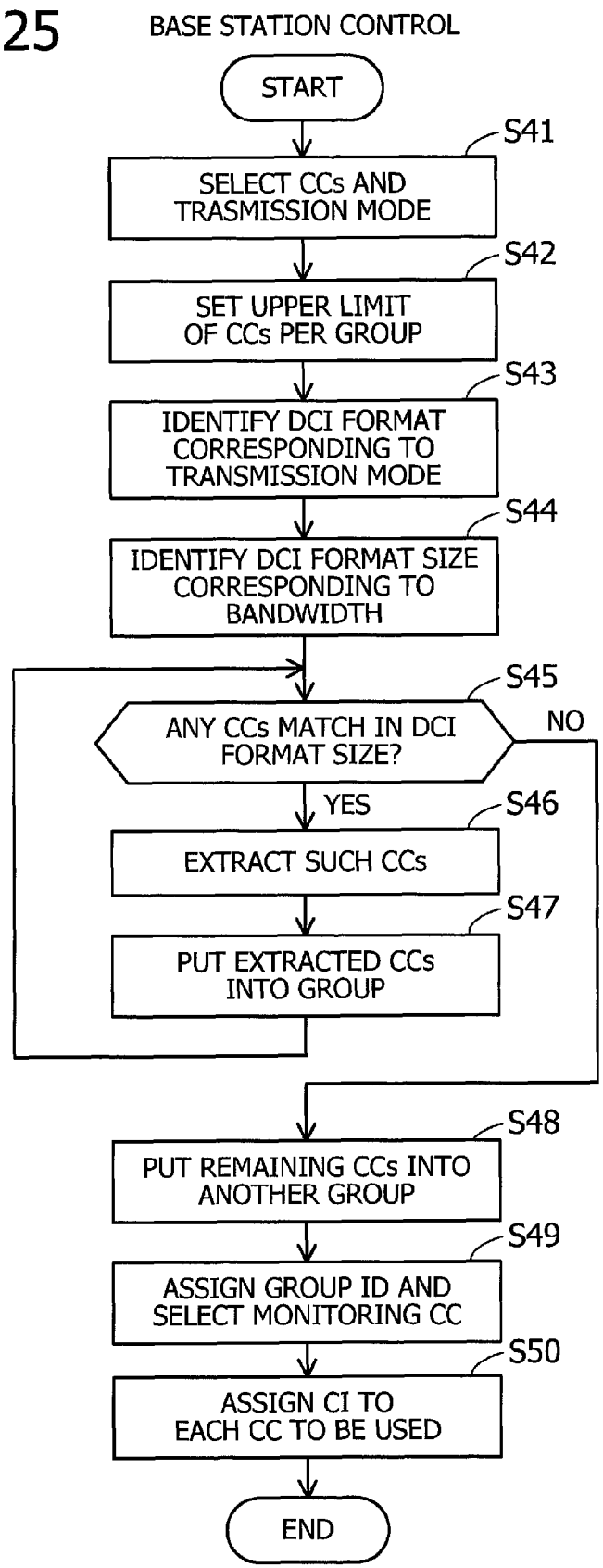
FIG. 25 is a flowchart of base station control according to a fifth embodiment.

FIG. 25 is a flowchart of base station control according to the fifth embodiment. This flowchart illustrates a specific example of what the base station 100 performs at step S3 in FIG. 13. Each step in FIG. 25 will now be described below in the order of step numbers.

(S41) The transmission mode setting unit 112 selects CCs for use in data communication with the mobile station 200. The transmission mode setting unit 112 also determines transmission mode of each CC to be used.

(S42) The grouping unit 113 sets an upper limit to the number of CCs that can form a single group.

(S43) The grouping unit 113 identifies the DCI format corresponding to the transmission mode selected for each CC at step S41.

(S44) Based on the DCI format and bandwidth identified at step S43, the grouping unit 113 identifies the DCI format size of each CC. Here the DCI format size denotes the signal length of DCI format 1, 1B, 1D, 2, 2A, or 2B selected depending on the transmission mode of CC.

Referring to DCI formats 1, 1B, 1D, 2, 2A, and 2B in the table of FIG. 9, the size takes a value of 43 bits in five cases (i.e., in five different combinations of bandwidth and DCI format). The size takes a value of 45 bits in four cases, 47 bits in six cases, 49 bits in seven cases, 50 bits in six cases, 52, 53, 57, or 58 bits in two cases each, 61 bits in four cases, and 67 bits in three cases. It is noted that some CCs may have the same DCI format size in spite of their different bandwidths.

(S45) When there are free CCs that do not belong to any existing groups, the grouping unit 113 determines whether they include two or more CCs that match in the DCI format size identified at step S44. If such CCs are found, the process advances to step S46. If there are no such CCs, the process proceeds to step S48.

(S46) The grouping unit 113 extracts a plurality of free CCs that match in the DCI format size identified at step S44, within the upper limit set at step S42.

(S47) The grouping unit 113 creates a group from the CCs extracted at step S46. The process then goes back to step S45.

(S48) If there still remain free CCs that do not belong to any existing groups, the grouping unit 113 puts those CCs into another new group, within the upper limit set at step S42.

(S49) The grouping unit 113 assigns a group ID to each group defined at steps S47 and S48. The grouping unit 113 also selects at least one monitoring CC for each group.

(S50) The CI assignment unit 114 assigns a CI to each CC to be used.

As can be seen from the above, the fifth embodiment is designed to extract CCs that match in the size of DCI format, which is selected depending on transmission mode, and try to put such CCs into a single group as much as possible. It is noted that CCs belonging to a group do not always have the same bandwidth. Suppose, for example, the case in which one monitoring CC is used to transmit control signals related to two CCs extracted as a group in the way described above in step S46. Because the common search space does not undertake cross-carrier scheduling as mentioned above, its candidate set for signal length is formed only from one common signal length of DCI formats 0, 1A, 3, and 3A and a specific signal length of DCI format 1C. About the UE-specific search space, its candidate set is formed from common signal lengths of DCI formats 0 and 1A and one of the size candidates of DCI format 1, 1B, 1D, 2, 2A, and 2B. Here, the possible signal lengths of DCI formats 0 and 1A may be increased up to two fold in the case where the two CCs have different bandwidths. Accordingly, the mobile station 200 may perform up to 60 attempts (=2×6+2×16+1×16) of blind decoding, just as in the case of CC#1.

As can be seen from the above discussion, DCI formats are categorized into (a) those independent of transmission mode and (b) those dependent of transmission mode. The fifth embodiment is designed to form a group of CCs that share the same DCI format size in terms of the latter category. As a variation of the fifth embodiment, it is also possible to form a group of CCs that share the same DCI format size in terms of the former category. In that case, CCs are grouped together if their bandwidths are identical, regardless of which transmission mode is set.

The above-described mobile communications system of the fifth embodiment mitigates the increase of candidates for the signal length, with respect to at least one of the mode-independent category of DCI formats and mode-dependent category of DCI formats. Accordingly, the mobile stations 200 and 200a have only to execute a limited number of blind decoding operations. The fifth embodiment thus alleviates the burden on the mobile stations 200 and 200a. It is also possible to combine the grouping methods proposed in the second to fifth embodiments. For example, the system may be configured to apply the proposed method of the fifth embodiment when it is unable to extract a plurality of CCs that have the same transmission mode or DCI format.

(f) Sixth Embodiment

This section describes a sixth embodiment, with a focus on its difference from the second embodiment. See the preceding section for their common features. The sixth embodiment provides a mobile communications system that uses a combination of grouping methods proposed above in the second to fifth embodiments.

The sixth embodiment can be implemented in a mobile communications system with the same structure discussed in FIG. 2 for the second embodiment. The block structures of a base station and a mobile station respectively illustrated in FIGS. 11 and 12 for the second embodiment can similarly be applied to those in the sixth embodiment. The exception is that the grouping unit 113 operates differently from the second embodiment. The following description of the sixth embodiment will use the same reference numerals seen in FIGS. 11 and 12.

According to the sixth embodiment, a plurality of grouping methods are used in a plurality of patterns, depending on the combination of bandwidth and transmission mode. For example, a set of grouping methods are categorized into a plurality of patterns in descending order of the reduction in the number of blind decoding operations. Each pattern includes one or more grouping methods. These grouping methods may be, for example, the ones discussed in the second to fifth embodiments. Specifically, the sizes of DCI format are determined from combinations of bandwidth and transmission mode. Some CCs may have commonality in the DCI format size, and other CCs may not. The sixth embodiment sorts the grouping methods in descending order of such commonality between CCs.

More specifically, the sixth embodiment defines three patterns referred to as "Pattern n" (n=1 to 3). Pattern 1 includes three grouping methods, which are referred to as "Grouping method m" (m=1 to 3). Pattern 2 includes the first two grouping methods, i.e., Grouping method 1 and Grouping method 2. Pattern 3 includes only one grouping method, Grouping method 1. Details of Patterns 1 to 3 are as follows.

(1) Pattern 1 is applied to CCs that match in both the size of mode-independent DCI format and the size of mode-dependent DCI format. Pattern 1 includes:

(1a) Grouping method 1 to group free CCs together when they match in both the bandwidth and transmission mode (This method corresponds to the second embodiment)

(1b) Grouping method 2 to group free CCs together when they differ in the transmission mode, but match in the bandwidth and the DCI format corresponding to transmission mode (This method corresponds to the third embodiment)

(1c) Grouping method 3 to group free CCs together when they differ in the transmission mode and DCI format corresponding thereto, but match in the bandwidth and the DCI format size corresponding to transmission mode (This method corresponds to the fourth embodiment)

(2) Pattern 2 is applied to CCs that match in either the size of mode-independent DCI format or the size of mode-dependent DCI format. Pattern 2 includes:

(2a) Grouping method 1 to group free CCs together when they match in the bandwidth, but differ in the size of mode-dependent DCI format (2b) Grouping method 2 to group free CCs together when they differ in the bandwidth, but match in the size of mode-dependent DCI format (This method corresponds to the fifth embodiment)

(3) Pattern 3 is applied to CCs that differ in both the size of mode-independent DCI format and the size of mode-dependent DCI format. Pattern 3 includes:

(3a) Grouping method 3 to group free CCs together when they differ in both the bandwidth and the size of mode-dependent DCI formats, within an upper limit previously defined for the number of CCs per group.

FIG. 26 is a flowchart of base station control according to the sixth embodiment. This flowchart illustrates a specific example of what the base station 100 performs at step S3 in FIG. 13. Each step in FIG. 26 will now be described below in the order of step numbers.

(S51) The transmission mode setting unit 112 selects CCs for use in data communication with the mobile station 200. The transmission mode setting unit 112 also determines transmission mode of each CC to be used.

(S52) The grouping unit 113 sets an upper limit to the number of CCs that can form a single group.

(S53) The grouping unit 113 initializes parameter n to one (n=1). This parameter n represents the pattern number.

(S54) The grouping unit 113 initializes parameter m to one (m=1). This parameter m represents the grouping method number specifying a particular grouping method included in a given pattern.

(S55) The grouping unit 113 extracts a set of CCs by applying Grouping method m in Pattern n to free CCs that do not belong to any existing groups.

(S56) The grouping unit 113 creates a group from the CCs extracted at step S55.

(S57) The grouping unit 113 determines whether every grouping method in Pattern n has been applied. If so, the process advances to step S59. If there is a grouping method that has not been applied, the process proceeds to step S58.

(S58) The grouping unit 113 increments parameter m by one to select the next grouping method included in the present Pattern n. The process then goes back to step S55.

(S59) The grouping unit 113 determines whether every predefined pattern has been applied. If so, the process advances to step S61. If there is a pattern that has not been applied, the process proceeds to step S60.

(S60) The grouping unit 113 increments parameter n by one to select the next pattern. The process then goes back to step S54.

(S61) If there still remain free CCs that do not belong to any existing groups, the grouping unit 113 puts those CCs into another new group, within the upper limit set at step S52.

(S62) The grouping unit 113 assigns a group ID to each group defined at steps S56 and S61. The grouping unit 113 also selects at least one monitoring CC for each group.

(S63) The CI assignment unit 114 assigns a CI to each CC to be used.

The mobile stations 200 and 200a use a plurality of CCs in their data communication, under the cross-carrier scheduling by the base station 100. The sixth embodiment mitigates the increase in the number of PDCCH signal length candidates per monitoring CC even in such situations. The sixth embodiment also makes it possible to concentrate control signals into a single search space on a monitoring CC when their signal length candidates are identical. Accordingly, the mobile stations 200 and 200a have only to execute a limited number of blind decoding operations. The sixth embodiment thus alleviates the burden on the mobile stations 200 and 200a. Unlike other embodiments, the sixth embodiment combines multiple grouping methods by giving priority to the grouping methods that can limit the repetition of blind decoding more effectively.

While the above-described process tries every grouping method in every pattern, the sixth embodiment may be modified to selectively execute some patterns and some grouping methods that satisfy given conditions.

(g) Conclusion

Various embodiments have been described above. The proposed radio communication method, system, and apparatus may alleviate the burden of detecting control signals for use in data communication with multiple frequency bands.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A radio communication method for first and second radio communication apparatuses to communicate with each other by using a plurality of frequency bands including first and second frequency bands, the method comprising:

determining, by the first radio communication apparatus, whether to use one frequency band or more than one frequency band to transmit a first control signal and a second control signal, based on bandwidths of the first and second frequency bands and transmission mode of each of the first and second frequency bands in which communication is performed, the first control signal carrying information to be used in communication performed with the first frequency band, the second control signal carrying information to be used in communication performed with the second frequency band;

transmitting, by the first radio communication apparatus, the first and second control signals by using one or more of the frequency bands depending on a result of the determining;

selecting, by the second radio communication apparatus, common candidates for signal length that are applicable to both the first control signal and second control signal, based on the bandwidths of the first and second frequency bands, when the first and second control signals are transmitted with one frequency band; and detecting, by the second radio communication apparatus, the first and second control signals by attempting signal extraction from received signals with each of the common candidates for the signal length;

wherein the determining by the first radio communication apparatus determines to use one frequency band to transmit both the first and second control signals when the first frequency band and the second frequency band are equal in terms of the bandwidth and the transmission mode.

2. The radio communication method according to claim 1, wherein the determining by the first radio communication apparatus includes:

identifying a control signal format corresponding to the transmission mode of each of the first and second frequency bands, and assigning the first and second control signals, in preference to other control signals, to one frequency band for transmission thereof, when the first frequency band and the second frequency band are equal in terms of the bandwidth and the control signal format.

3. The radio communication method according to claim 1, wherein the determining by the first radio communication apparatus includes:

identifying a control signal format corresponding to the transmission mode of each of the first and second frequency bands, and assigning the first and second control signals, in preference to other control signals, to one frequency band for transmission thereof, when the first frequency band and the second frequency band are equal in terms of the bandwidth and possible signal lengths defined in the control signal formats.

4. The radio communication method according to claim 1, wherein the determining by the first radio communication apparatus includes:

selecting a plurality of candidates for the signal length that correspond to combinations of the bandwidth and transmission mode, and assigning the first and second control signals, in preference to other control signals, to one frequency band for transmission thereof, when the first and second frequency bands share a common candidate for the signal length.

5. The radio communication method according to claim 1, further comprising:

selecting, by the first radio communication apparatus, which method to use in preference to others, from among a plurality of methods to determine whether to use one frequency band or more than one frequency band to transmit the first and second control signals, depending on the bandwidths and transmission modes of the first and second frequency band.

6. The radio communication method according to claim 1, further comprising:

configuring, by the first radio communication apparatus, a single frequency band so as to transmit the first and second control signals in preference to others, when the first and second frequency bands are equal in the bandwidth.

7. The radio communication method according to claim 1, further comprising:
sending information from the first radio communication apparatus to the second radio communication apparatus to indicate associations between the first and second frequency bands and frequency bands used to transmit the first and second control signals;
wherein the detecting detects the first and second control signals based on the information sent from the first radio communication apparatus.

8. A radio communications system in which communication is performed with a plurality of frequency bands including first and second frequency bands, the radio communications system comprising:
a first radio communication apparatus including:
a first control unit that determines whether to use one frequency band or more than one frequency band to transmit a first control signal and a second control signal, based on bandwidths of the first and second frequency bands and transmission mode of each of the first and second frequency bands in which communication is performed, the first control signal carrying information to be used in communication performed with the first frequency band, the second control signal carrying information to be used in communication performed with the second frequency band, and
a transmission unit that transmits the first and second control signals by using one or more of the frequency bands depending on a determination result of the first control unit; and
a second radio communication apparatus including:
a second control unit that selects common candidates for signal length that are applicable to both the first control signal and second control signal, based on the bandwidths of the first and second frequency bands, when the first and second control signals are transmitted with one frequency band, and
a signal processing unit that detects the first and second control signals by attempting signal extraction from received signals with each of the common candidates for the signal length;
wherein the first control unit determines to use one frequency band to transmit both the first and second control signals when the first frequency band and the second frequency band are equal in terms of the bandwidth and the transmission mode.

9. A radio communication apparatus that communicates with another radio communication apparatus by using a plurality of frequency bands including first and second frequency bands, the radio communication apparatus comprising:
a control unit that determines whether to use one frequency band or more than one frequency band to transmit a first control signal and a second control signal, based on bandwidths of the first and second frequency bands and transmission mode of each of the first and second frequency bands in which communication is performed, the first control signal carrying information to be used in communication performed with the first frequency band, the second control signal carrying information to be used in communication performed with the second frequency band; and
a transmission unit that transmits the first and second control signals by using one or more of the frequency bands depending on a determination result of the control unit;
wherein the control unit determines to use one frequency band to transmit both the first and second control signals when the first frequency band and the second frequency band are equal in terms of the bandwidth and the transmission mode.

10. A radio communication apparatus that communicates with another radio communication apparatus by using a plurality of frequency bands including first and second frequency bands, the radio communication apparatus comprising:
a reception unit that receives signals including first and second control signals that are transmitted with one frequency band to deliver information to be used in communication performed with the first and second frequency bands;
a control unit that selects common candidates for signal length that are applicable to both the first control signal and second control signal, based on bandwidths of the first and second frequency bands; and
a signal processing unit that detects the first and second control signals by attempting signal extraction from the received signals with each of the common candidates for the signal length;
wherein said another radio communication apparatus determines to use one frequency band to transmit both the first and second control signals when the first frequency band and the second frequency band are equal in terms of bandwidth and transmission mode of each of the first and second frequency bands in which communication is performed.

11. A radio communications system in which communication is performed with a plurality of frequency bands including first and second frequency bands, the radio communications system comprising:
a first radio communication apparatus including:
a first control unit that determines at least one frequency band to transmit a first control signal and a second control signal, the first control signal carrying information to be used in communication performed with the first frequency band, the second control signal carrying information to be used in communication performed with the second frequency band, and
a transmission unit that transmits the first and second control signals by using the determined at least one frequency band depending on a determination result of the first control unit; and
a second radio communication apparatus including:
a second control unit that selects candidates for signal lengths that are applicable to the first control signal and the second control signal, based on bandwidths of the first and second frequency bands, and
a signal processing unit that detects the first and second control signals by attempting signal extraction from received signals with each of the candidates for the signal lengths.

12. The radio communication system according to claim 11, wherein:
the first control unit in the first radio communication apparatus controls transmission of information to the second radio communication apparatus to indicate associations between the first and second frequency bands and frequency bands used to transmit the first and second control signals, and the signal processing unit in the second communication apparatus detects the first and second control signals based on the information sent from the first radio communication apparatus.

* * * * *